(12) United States Patent
Hamai et al.

(10) Patent No.: US 7,244,210 B2
(45) Date of Patent: Jul. 17, 2007

(54) POWER TRANSMISSION APPARATUS FOR VEHICLE AND VEHICLE-DRIVING ELECTRIC MACHINERY SYSTEM USING THE SAME

(75) Inventors: Kyugo Hamai, Yokosuka (JP); Hideki Sekiguchi, Takasaki (JP); Shogo Miyamoto, Hitachinaka (JP); Yoshikazu Tanaka, Miyagi (JP)

(73) Assignee: Hitachi, Ltd., Tokyo (JP)

( * ) Notice: Subject to any disclaimer, the term of this patent is extended or adjusted under 35 U.S.C. 154(b) by 382 days.

(21) Appl. No.: 10/970,660

(22) Filed: Oct. 22, 2004

(65) Prior Publication Data

US 2005/0143210 A1    Jun. 30, 2005

(30) Foreign Application Priority Data

Oct. 23, 2003   (JP) ............................. 2003-363260
Oct. 23, 2003   (JP) ............................. 2003-363261

(51) Int. Cl.
*F16H 48/30* (2006.01)

(52) U.S. Cl. ..................................... 475/150
(58) Field of Classification Search ............... 475/149, 475/150

See application file for complete search history.

(56) References Cited

U.S. PATENT DOCUMENTS

| 4,418,777 | A | * | 12/1983 | Stockton ..................... 180/65.6 |
| 4,483,408 | A |   | 11/1984 | Yazaki |
| 5,443,130 | A | * | 8/1995  | Tanaka et al. ............. 180/65.6 |
| 5,620,387 | A | * | 4/1997  | Janiszewski ................. 475/150 |
| 5,637,048 | A | * | 6/1997  | Maeda et al. ................ 475/150 |
| 5,718,300 | A | * | 2/1998  | Frost .......................... 180/65.1 |
| 5,751,081 | A |   | 5/1998  | Morikawa |
| 6,595,308 | B2| * | 7/2003  | Bowen ...................... 180/65.6 |
| 2003/0066694 | A1 | | 4/2003 | Mita et al. |

FOREIGN PATENT DOCUMENTS

| JP | 8-230489 | 9/1996 |
| JP | 2001-330111 A | 11/2001 |

OTHER PUBLICATIONS

European Search Report No. EP 04 02 5216, dated Dec. 12, 2005.

\* cited by examiner

*Primary Examiner*—Dirk Wright
(74) *Attorney, Agent, or Firm*—Crowell & Moring LLP

(57) ABSTRACT

The invention provides a power transmission apparatus for vehicle which can realize a high torque transmission efficiency and a high reduction gear ratio of a reduction gear unit with a more compact structure, and a vehicle-driving electric machinery system using the power transmission apparatus for vehicle. The power transmission apparatus for vehicle comprises a motor, a reduction gear unit for decelerating power outputted from the motor, and a differential gear unit for distributing the power decelerated by the reduction gear unit to left and right wheels. The reduction gear unit is a reduction gear mechanism including a plurality of gears mounted over a shaft which is rotatably held by a housing in a fixed position. The reduction gear unit and the differential gear unit are arranged within an area in oppositely facing relation to an axial end surface of the motor.

25 Claims, 11 Drawing Sheets

POWER TRANSMISSION APPARATUS FOR VEHICLE AND VEHICLE-DRIVING ELECTRIC MACHINERY SYSTEM USING THE SAME

BACKGROUND OF THE INVENTION

1. Field of the Invention

The present invention relates to a power transmission apparatus for vehicle employing a motor as a power source, and to a vehicle-driving electric machinery system using the power transmission apparatus for vehicle. More particularly, the present invention relates to a power transmission apparatus for vehicle suitable for use in a vehicle including a reduction gear unit and a differential gear unit, and to a vehicle-driving electric machinery system using the power transmission apparatus for vehicle.

2. Description of the Related Art

In a known power transmission apparatus for vehicle employing a motor as a power source, output power of the motor is transmitted to driving wheels through a reduction gear unit to produce a large driving torque, as disclosed in, e.g., JP,A 2001-330111 and JP,A 8-230489.

The system disclosed in JP,A 2001-330111 employs, as the reduction gear unit, a mechanism comprising a plurality of planetary gears.

Also, the reduction gear unit used in JP,A 8-230489 comprises an input shaft coupled to a shaft of a motor, an output shaft disposed parallel to the input shaft and coupled to the driving wheel side, and a transmitting mechanism for transmitting power between the input and output shafts. The transmitting mechanism comprises a first small gear, a first large gear, a second small gear, and a second large gear.

Further, a known power transmission apparatus for vehicle comprises a motor serving as a torque power generator, a reduction gear unit for decelerating torque power outputted from the motor, and a differential gear unit for distributing the torque power, which has been reduced in speed by the reduction gear unit, to left and right wheels. Then, as disclosed in, e.g., JP,A 9-300993, respective axes of the motor, the reduction gear unit, and the differential gear unit are arranged to lie at apexes of a triangle, looking from side.

SUMMARY OF THE INVENTION

However, when a planetary gearing is employed as the reduction gear unit as disclosed in the above-cited JP,A 2001-330111, one planetary gear set is constituted by an increased number of gears, i.e., one sun gear, one internal ring gear, and three or four pinion gears. Therefore, the number of meshes between the gears increases, and the power transmission efficiency of the reduction gear unit reduces. In addition, because the planetary gearing includes a radial needle bearing and a thrust washer bearing for each of the three or four pinion gears, the power transmission efficiency further reduces.

In the planetary reduction gear unit, assuming that a gear ratio (=the number ZS of teeth of a sun gear S/the number ZR of teeth of an internal ring gear R) of the planetary gearing is $\rho$, a reduction gear ratio i (=rotational speed of the input shaft/rotational speed of the output shaft) is expressed by the following formula (1):

$$i = (1+\rho)/\rho \quad (1)$$

When the gear ratio $\rho$=about 0.5 is set in the above formula (1), the reduction gear ratio i is about 3. Also, when the gear ratio $\rho$=about 0.2 is set, the reduction gear ratio i is about 6. On the other hand, because there is a limitation in reducing the diameter of the sun gear S from the viewpoint of design, the diameter of the internal ring gear R must be increased to reduce the gear ratio $\rho$. However, increasing the diameter of the internal ring gear R is not preferable from the viewpoint of mounting the reduction gear unit in a vehicle because the diameter of the reduction gear unit increases correspondingly and a slope angle $\theta$ of a drive shaft is excessively increased to ensure a minimum road clearance. For that reason, the reduction gear ratio i practically feasible in the planetary gearing is about 3, and plural trains of planetary gearings must be combined with each other in order to obtain a larger reduction gear ratio. Using a plurality of planetary gearings further reduces the power transmission efficiency. A reduction of the power transmission efficiency increases an energy loss and reduces the mileage of a motor-driven vehicle per charge. Further, a larger number of components increase not only the weight, but also the cost of the planetary reduction gear unit.

Meanwhile, when the reduction gear unit is constituted by using the parallel axes as disclosed in the above-cited JP,A 8-230489, a drive shaft from which torque power is distributed to the left and right through the differential gear unit is disposed outside the circumference of the motor, and therefore the size of the reduction gear unit increases in the radial direction of the motor. An increase in the size of the reduction gear unit requires a larger space for mounting of the reduction gear unit in the vehicle and hence narrows a compartment space.

The known structure disclosed in the above-cited JP,A 9-300993 has problems as follows. In the process of transmitting output power of a motor, a tangential force, a separation force and a thrust force generate at a meshing point between gears mounted over a motor output shaft and a rotary shaft of the reduction gear unit and at a meshing point between gears mounted over the rotary shaft of the reduction gear unit and a rotary shaft of the differential gear unit. Further, resultant forces (i.e., a radial load and a thrust load) of the above forces act upon bearings of the rotary shafts and bearing supports. Accordingly, depending on the positional relationship among respective axes of the rotary shafts of the motor, the reduction gear unit and the differential gear unit, the tangential force, the separation force and the thrust force may act in directions in which those forces are added, thus resulting in larger radial loads that act upon the bearings and the bearing supports. In such a case, the bearings and the bearing supports must be increased in size to ensure sufficient strength of the bearings and the bearing supports, whereby a difficulty arises in arrangement of the parts.

One object of the present invention is to provide a power transmission apparatus for vehicle which can realize a high torque transmission efficiency and a high reduction gear ratio of a reduction gear unit with a more compact structure, and a vehicle-driving electric machinery system using the power transmission apparatus for vehicle.

Another object of the present invention is to provide a power transmission apparatus for vehicle which can reduce radial loads acting upon the bearings and the bearing supports with a more compact structure, and a vehicle-driving electric machinery system using the power transmission apparatus for vehicle.

To achieve the above object, the present invention provides a power transmission apparatus for vehicle comprising a motor, a reduction gear unit for decelerating power outputted from the motor, and a differential gear unit for distributing the power decelerated by the reduction gear unit to left and right wheels, wherein the reduction gear unit is a reduction gear mechanism including a rotary shaft which is rotatably held by a housing and over which a plurality of gears are mounted in parallel, and the reduction gear unit and the differential gear unit are arranged within an area in oppositely facing relation to an axial end surface of the motor.

That construction makes it possible to increase the torque transmission efficiency of the reduction gear mechanism, to obtain a large reduction gear ratio, and to realize a more compact system.

Also, to achieve the above object, the present invention provides a power transmission apparatus for vehicle for transmitting power outputted from a power supply source to axles of vehicle wheels, the power transmission apparatus for vehicle comprising a motor constituting the power supply source; a reduction gear unit for receiving and decelerating the power outputted from the motor; and a differential gear unit for receiving the power from the reduction gear unit and distributing the received power to at least two outputs, wherein the reduction gear unit is a gear mechanism mechanically connected to the motor and the differential gear unit, the gear mechanism includes a rotary shaft over which a plurality of gears are mounted and which is arranged parallel to at least an output shaft of the motor, and the reduction gear unit and the differential gear unit are arranged within an area in oppositely facing relation to an axial end surface of the motor.

That construction makes it possible to increase the torque transmission efficiency of the reduction gear mechanism, to obtain a large reduction gear ratio, and to realize a more compact system.

Further, to achieve the above object, the present invention provides a vehicle-driving electric machinery system for transmitting power to axles of vehicle wheels and driving a vehicle, the vehicle-driving electric machinery system comprising a motor driven by a vehicle-loaded electric power supply source serving as a driving source, and generating the power; and a power transmission apparatus for vehicle for transmitting the power outputted from the motor to the axles, the power transmission apparatus for vehicle comprising a reduction gear unit for receiving and decelerating the power outputted from the motor; and a differential gear unit for receiving the power from the reduction gear unit and distributing the received power to at least two outputs, wherein the power transmission apparatus for vehicle is arranged within an area in oppositely facing relation to an axial end surface of the motor, the power transmission apparatus for vehicle is disposed in a housing together with the motor to constitute one unit, the axles are mechanically connected to ends of output shafts of the differential gear unit, the reduction gear unit is a gear mechanism including a rotary shaft over which a plurality of gears are mounted and which is arranged parallel to at least an output shaft of the motor, and the reduction gear unit mechanically connects the motor and the differential gear unit to each other.

That construction makes it possible to increase the torque transmission efficiency of the reduction gear mechanism, to obtain a large reduction gear ratio, and to realize a more compact system.

Still further, to achieve the above object, the present invention provides a power transmission apparatus for vehicle comprising a motor, a reduction gear unit including at least two shafts parallel to an axis of the motor and decelerating power outputted from the motor, and a differential gear unit for distributing the power decelerated by the reduction gear unit to left and right wheels, wherein assuming that O'-W' represents a line connecting an axis of an output shaft of the motor and an axis of a first shaft of the reduction gear unit, and that P1 represents a tangential force generating at a mesh point between a gear mounted over the output shaft of the motor and a gear mounted over a rotary shaft of the reduction gear unit and acting upon one of the gears on the driven side when a vehicle runs forward, an axis X of a second shaft of the reduction gear unit is arranged on the side in the same direction as a vector of the tangential force P1 with respect to the line O'-W'.

That construction makes it possible to reduce radial loads acting upon bearings and bearing supports, and to realize a more compact system.

Still further, to achieve the above object, the present invention provides a vehicle-driving electric machinery system for transmitting power to axles of vehicle wheels and driving a vehicle, the vehicle-driving electric machinery system comprising a motor driven by a vehicle-loaded electric power supply source serving as a driving source, and generating the power; and a power transmission apparatus for vehicle for transmitting the power outputted from the motor to the axles, the power transmission apparatus for vehicle comprising the motor; a reduction gear unit including at least two shafts parallel to an axis of the motor and decelerating the power outputted from the motor; and a differential gear unit for distributing the power decelerated by the reduction gear unit to left and right wheels, wherein assuming that O'-W' represents a line connecting an axis of an output shaft of the motor and an axis of a first shaft of the reduction gear unit, and that P1 represents a tangential force generating at a mesh point between a gear mounted over the output shaft of the motor and a gear mounted over a rotary shaft of the reduction gear unit and acting upon one of the gears on the driven side when a vehicle runs forward, an axis X of a second shaft of the reduction gear unit is arranged on the side in the same direction as a vector of the tangential force P1 with respect to the line O'-W'.

That construction makes it possible to reduce radial loads acting upon bearings and bearing supports, and to realize a more compact system.

DESCRIPTION OF THE PREFERRED EMBODIMENTS

The construction of a power transmission apparatus for vehicle according to a first embodiment of the present invention will be described below with reference to FIGS. 1 to 8. This embodiment is described, by way of example, in connection with the case in which respective axes of a motor shaft and an output shaft of a differential gear unit are parallel to each other.

Figure 1:
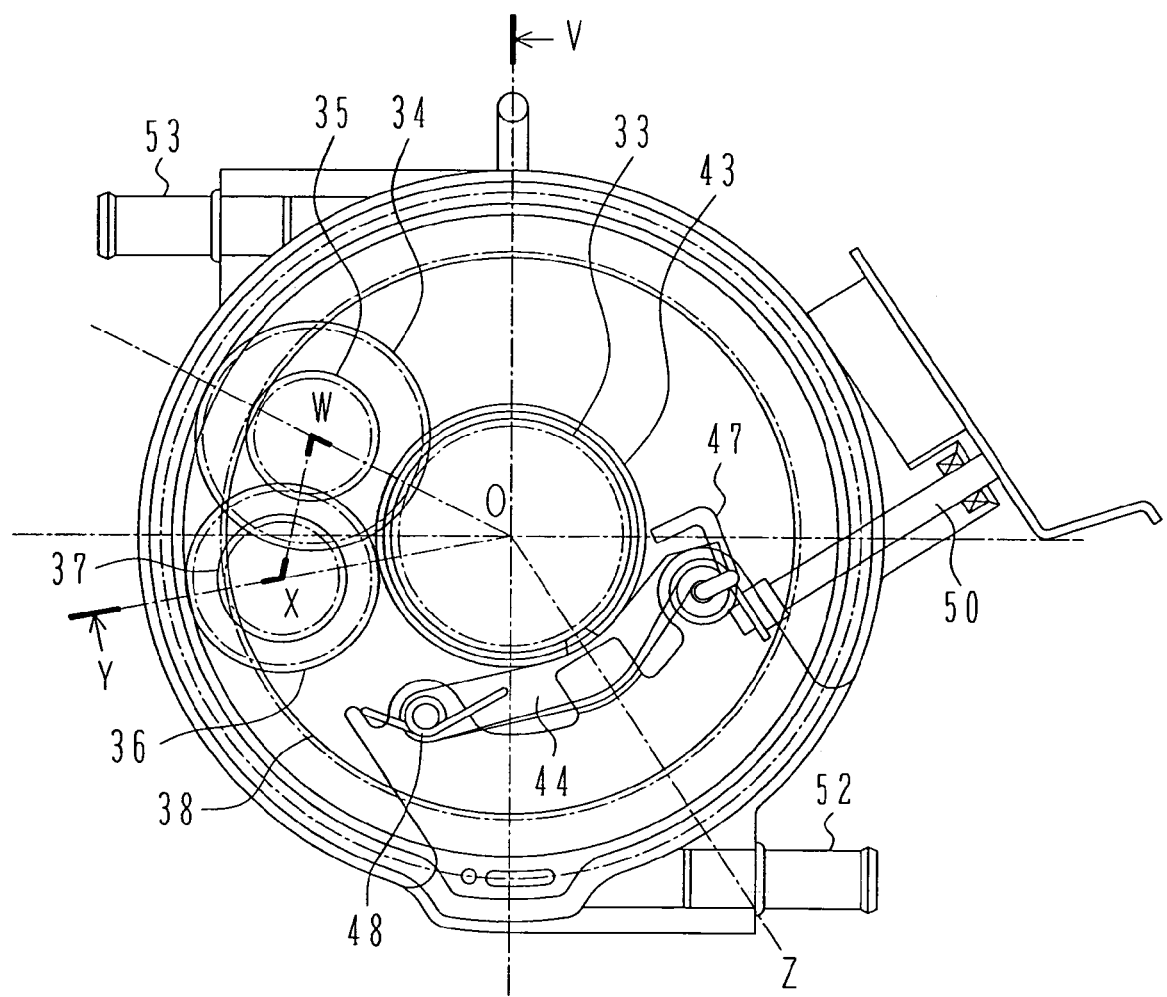
FIG. 1 is a front view of a power transmission apparatus for vehicle according to a first embodiment of the present invention.
Figure 2:
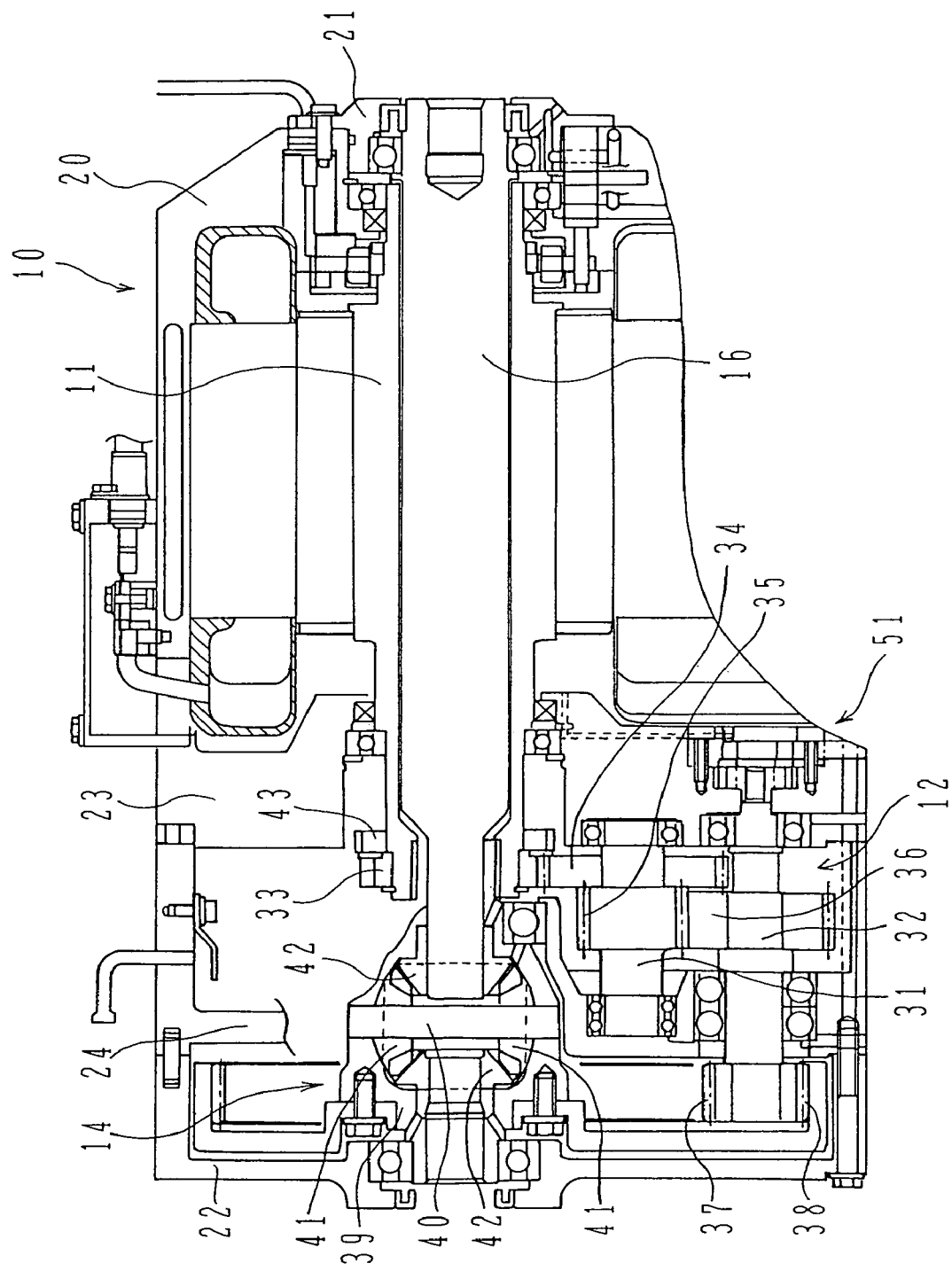
FIG. 2 is a side view taken along a section V-O-W-X-Y in FIG. 1.
Figure 3:
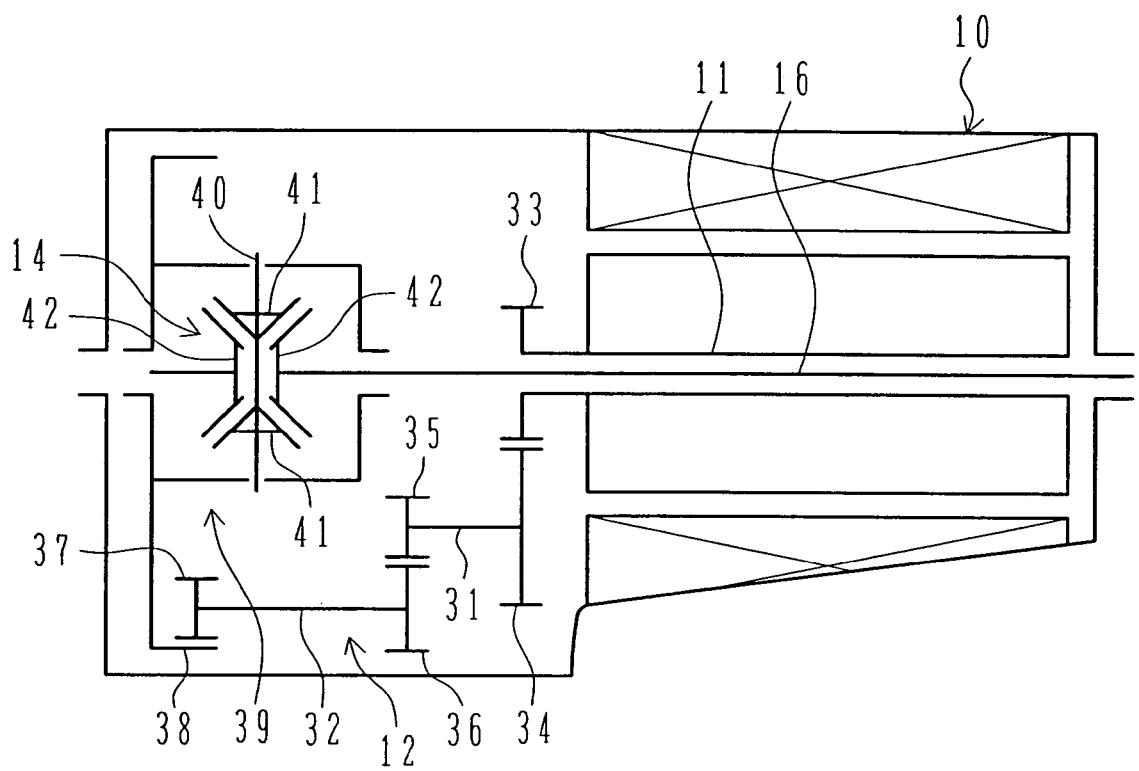
FIG. 3 is a schematic functional view taken along the section V-O-W-X-Y in FIG. 1.
Figure 4:
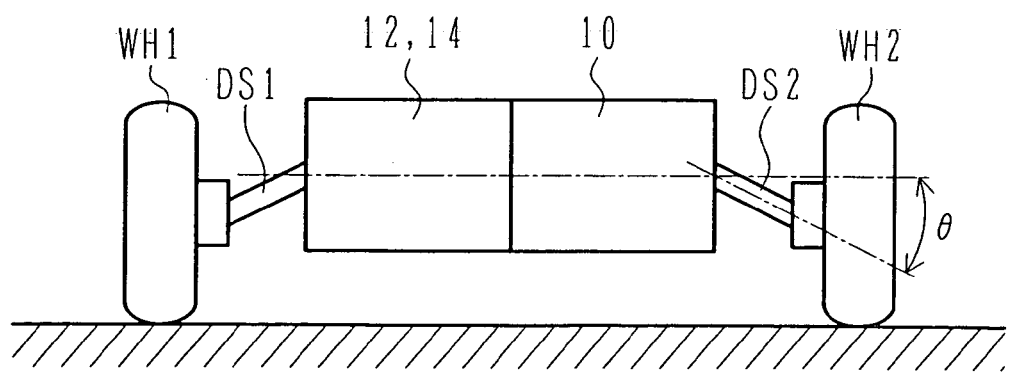
FIG. 4 is a front view of a vehicle driving system using the power transmission apparatus for vehicle according to the first embodiment of the present invention.

FIG. 1 is a front view of the power transmission apparatus for vehicle according to the first embodiment of the present invention, and FIG. 2 is a side view taken along a section V-O-W-X-Y in FIG. 1. FIG. 3 is a schematic functional view taken along the section V-O-W-X-Y in FIG. 1, and FIG. 4 is a front view of a vehicle driving system using the power transmission apparatus for vehicle according to the first embodiment of the present invention.

In FIGS. 2 and 3, a motor 10 is rotatable in forward and backward directions. Torque power outputted from the motor 10 is reduced in speed (decelerated) by a reduction gear unit 12 and then distributed to left and right driving systems through a differential gear unit 14. Gears A 33, B 34, C 35, D 36, and E 37 constituting the reduction gear unit 12 are all spur gears.

Of two outputs from the differential gear unit 14, one output is coupled to a right-side drive shaft DS2 (FIG. 4) through an extension drive shaft 16, which is extended to penetrate a hollow motor shaft 11 and is disposed coaxially with the motor shaft 11, for transmission to a right-side driving wheel WH2. The other output is coupled to a left-side drive shaft DS1 (FIG. 4) for transmission to a left-side driving wheel WH1.

As shown in FIG. 2, the motor 10, the reduction gear unit 12, and the differential gear unit 14 are disposed coaxially with each other in series within a housing made up of five members, i.e., a cylindrical housing 20, a first side housing 21, a second side housing 22, a first intermediate housing 23, and a second intermediate housing 24. The second side housing 22 and the second intermediate housing 24 both constituting a part of the reduction gear unit 12 each have a diameter equal to or smaller than that of the cylindrical housing 20 constituting a part of the motor 10.

The motor 10 is constituted as, e.g., a permanent magnet AC motor, an induction motor, a synchronous motor, or a DC motor. The motor 10 is integrally assembled in a space defined by the cylindrical housing 20, the first side housing 21, and the first intermediate housing 23, the latter two housings being fitted to opposite ends of the cylindrical housing 20. The motor 10 is rotated with electric driving power supplied from an electric power supply, such as a battery, through an inverter. The inverter changes the frequency and voltage of the electric driving power with a motor control computer (not shown), thereby performing torque control of the motor 10. Also, the inverter charges, in the battery, electric power generated when the motor 10 is forced to rotate.

The reduction gear unit 12 and the differential gear unit 14 are both disposed in a space defined by the first intermediate housing 23, the second side housing 22, and the second intermediate housing 24. The reduction gear unit 12 has two gear shafts, i.e., a first gear shaft 31 and a second gear shaft 32, which are parallel to the hollow output shaft 11 of the motor 10. The gear A 33 is mounted over the hollow output shaft 11 of the motor 10. The gear B 34 and the gear C 35 are mounted over the first gear shaft 31, and the gear D 36 and the gear E 37 are mounted over the second gear shaft 32. In other words, the reduction gear unit 12 is of the parallel shaft type comprising the first gear shaft 31 and the second gear shaft 32 each parallel to the output shaft 11 of the motor 10. The gears may be integral with the corresponding shafts.

The differential gear unit 14 comprises an internal ring gear F 38, a differential case 39 joined to the internal ring gear F 38 by bolts, pinion gears 41 fixed to the differential case 39 through a cross pin 40, and differential side gears 42 meshing with the pinion gears 41.

The torque power outputted from the motor 10 is subjected to a first stage speed reduction through the gear B 34 externally meshing with the gear A 33, to a second stage speed reduction through the gear D 36 externally meshing with the gear C 35, and to a third stage speed reduction through the internal ring gear F 38 internally meshing with the gear E 37. Thereafter, the torque power outputted from the motor 10 is distributed to the left and right driving systems through the differential gear unit 14. With such an arrangement, since the internal ring gear F 38 is constituted by internal teeth, a large reduction gear ratio (about 4 to 6) can be realized in combination of the internal ring gear F 38 and the gear E 37 without increasing the outer diameter of the internal ring gear F 38.

The second gear shaft 32 is rotated at a speed lower than the rotation of the motor 10 by an amount corresponding to the reduction gear ratio of the reduction gear unit 12. Because a maximum rotational speed of the motor 10 exceeds 10,000 rpm, the second gear shaft 32 is used to drive an oil pump 51 for lubricating the reduction gears disposed within the first intermediate housing 23 and respective bearings supporting the first gear shaft 31, the second gear shaft 32 and the motor shaft 11. Alternatively, the oil pump 51 may be driven by the first gear shaft 31 after the rotation of the motor 10 has been subjected to the first stage speed reduction.

Further, the gear E 37 and the internal ring gear F 38 agitate oil (not shown) in the reduction gear unit 12 for lubricating the gears, the bearings, etc. However, a larger quantity of oil to be agitated increases agitation resistance. In consideration of such a tendency, the first gear shaft 31 and the second gear shaft 32 are arranged at a certain angle with respect to the vertical direction such that a balance between the quantity of oil to be agitated and the agitation resistance is optimized.

Thus, the reduction gear unit 12 of this embodiment comprises the two shafts 31, 32 parallel to the axis of the output shaft 11 of the motor 10, and the various gears 33 to 38 mounted over those shafts and in the differential gear unit 14. As an alternative, the number of the shafts may be one. Further, the axis of the output shaft 16 of the differential gear unit 14 is coaxial with the axis of the output shaft 11 of the motor 10. With such a construction, the number of meshes between the gears reduces and so does the number of bearings, whereby the power transmission efficiency increases. An increase of the power transmission efficiency reduces an energy loss and increases the mileage of a motor-driven vehicle per charge. A cost reduction can also be realized. Further, since the diameter of each of the housings 22, 24 constituting a part of the reduction gear unit 12 can be made equal to or smaller than that of the cylindrical housing 20 constituting a part of the motor 10 (as described later in more detail with reference to FIG. 5), it is possible to reduce the size of the reduction gear unit 12.

In addition, since the oil pump 51 is disposed within the reduction gear unit 12 and is driven by the second gear shaft 32 with the torque power outputted from the motor 10 after being subjected to the speed reduction, the oil pump can be prevented from rotating at an excessively high speed. The prevention of the excessively high-speed rotation of the oil pump further contributes to preventing the oil pump from being damaged by cavitation.

Figure 5:
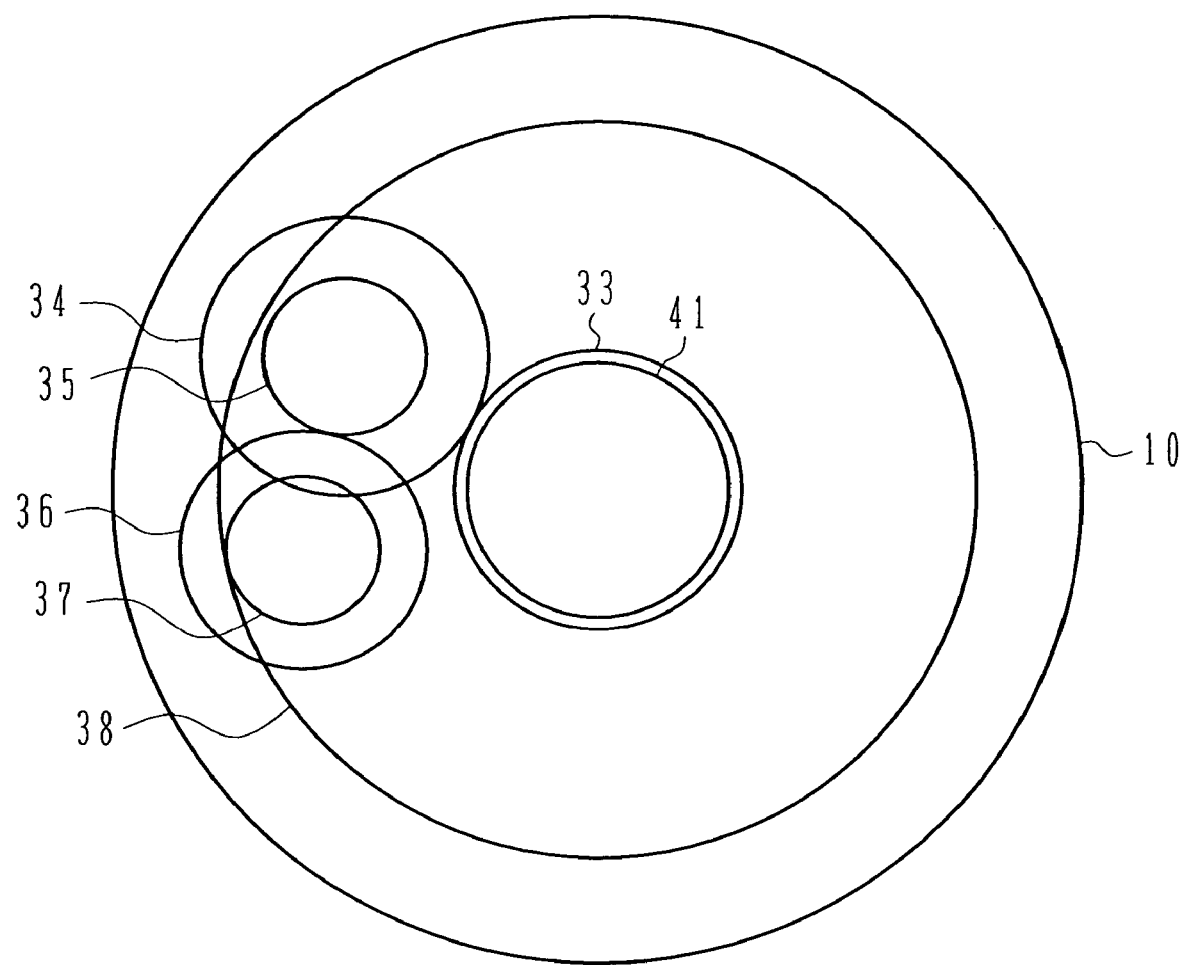
FIG. 5 is a front view showing a gear layout in the power transmission apparatus for vehicle according to the first embodiment of the present invention.

With reference to FIG. 5, a description is next made of a gear layout in the power transmission apparatus for vehicle according to the first embodiment of the present invention.

FIG. 5 is a front view showing the gear layout in the power transmission apparatus for vehicle according to the first embodiment of the present invention.

The gear A 33 mounted over the output shaft 11 of the motor 10 meshes with the gear B 34 of the reduction gear unit 12. The gear C 35 being coaxial with the gear B 34 meshes with the gear D 36. The gear E 37 being coaxial with the gear D 36 meshes with the internal ring gear F 38 of the differential gear unit 14. The internal ring gear F 38 drives the pinion gears 41. Note that a circle indicating each of the gears 33, 34, 35, 36, 37, 38 and 41 represents a pitch diameter.

As seen from FIG. 5, in this embodiment, the gears 33, 34, 35, 36, 37, 38 and 41 of both the reduction gear unit 12 and the differential gear unit 14 are all arranged inside the outer diameter of the motor 10. Stated another way, the reduction gear unit 12 and the differential gear unit 14 are arranged within an area in oppositely facing relation to an axial end surface of the motor 10 (i.e., an area indicated by the outer diameter of the motor 10 shown in FIG. 5). Further, the reduction gear unit 12 is not a reduction gear mechanism including a revolving shaft as used in a planetary gear mechanism, but it is a reduction gear mechanism including a plurality of gears mounted over the shafts 31, 32 that are rotatably supported by the housing in fixed positions.

With that feature, since the number of meshes between the gears reduces and so does the number of bearings, the power transmission efficiency can be increased. A cost reduction can also be realized. Further, the size of the power transmitting system can be reduced.

Figure 6:
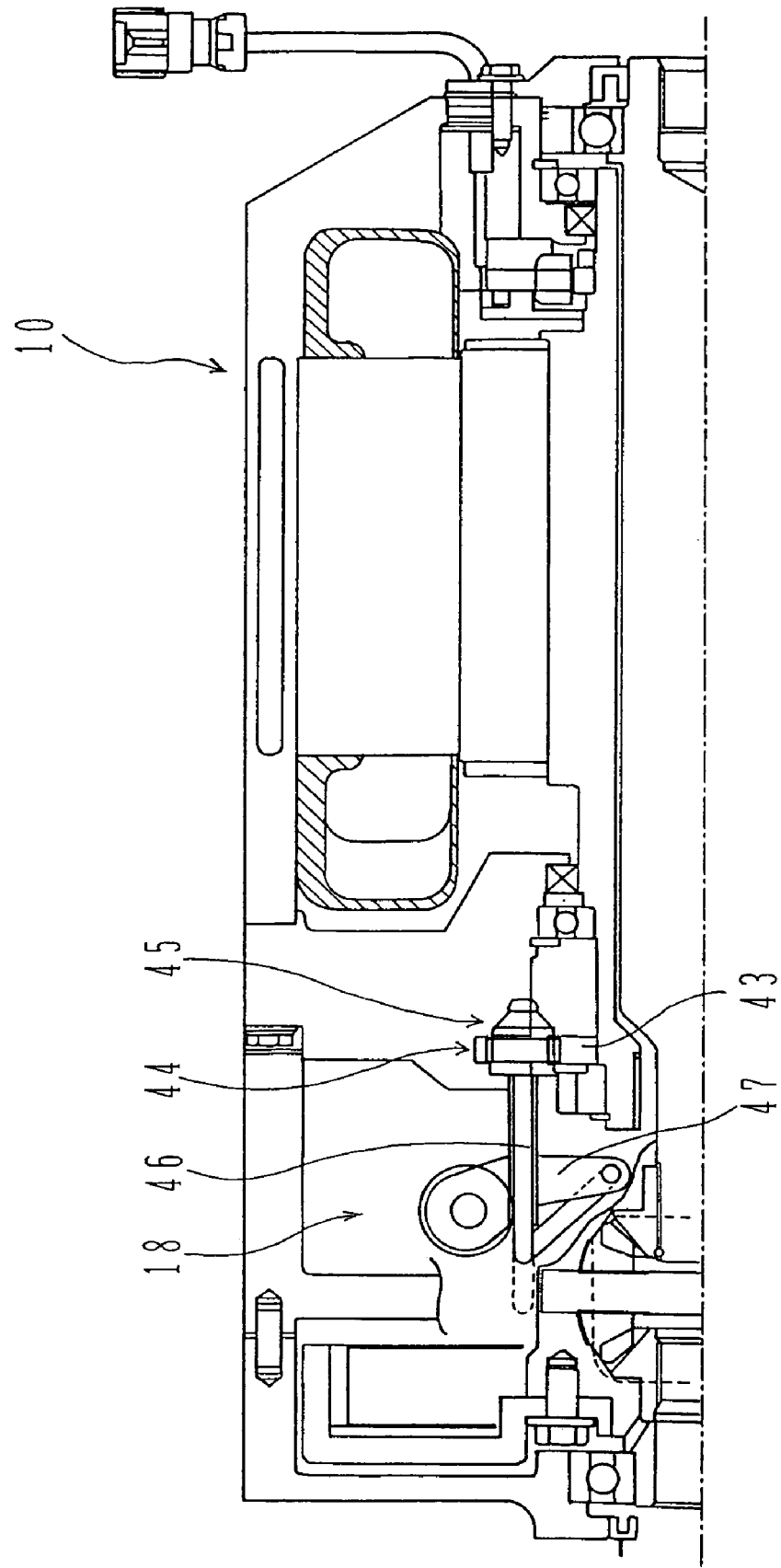
FIG. 6 is a side view, taken along a section Z-O in FIG. 1, showing a parking mechanism used in the power transmission apparatus for vehicle according to the first embodiment of the present invention.

With reference to FIGS. 1 and 6, a description is next made of a parking mechanism in the power transmission apparatus for vehicle according to the first embodiment of the present invention.

FIG. 6 is a side view, taken along a section Z-O in FIG. 1, showing the parking mechanism used in the power transmission apparatus for vehicle according to the first embodiment of the present invention.

A parking mechanism 18 comprises a parking gear 43 integrally mounted over the output shaft 11 of the motor 10, a parking pawl 44 serving as latch means meshing with the parking gear 43, a cam 45 cooperating with the parking pawl 44, a large-diameter rod 46 and a rod plate 47 for operating the cam 45, and a manual shaft 50 (see FIG. 1) for transmitting movement of a shift lever (not shown) disposed in the compartment to the rod 46 and the rod plate 47 through a coupling mechanism.

The parking mechanism 18 is disposed within the housing of the reduction gear unit 12 so as to position along a circumference about the axes of the motor 10 and the differential gear unit 14 in such a manner that the output shaft 11 of the motor 10 can be selectively fixed with respect to the housing. The parking pawl 44 is in the bent form having one end rotatably supported by the housing through a pawl shaft 48, an opposite end formed with a cam engaging surface, and a pawl portion in its central area. The cam 45 is slidably fitted over the large-diameter rod 46 and abuts against a distal end of the large-diameter rod 46 while undergoing a resilient load from a coil spring from behind. Then, the cam 45 is slidably supported by the housing 24. The rod 46 is inserted through the rod plate 47 such that a rotating motion of the rod plate 47 is converted into a linear motion of the rod 46. The rod plate 47 is fitted over the manual shaft 50. The manual shaft 50 is coupled to the shift lever (not shown) through the coupling mechanism.

In operation of the parking mechanism 18 constructed as described above, when the shift lever (not shown) is operated, the manual shaft 50 is rotated through the coupling mechanism, and the rod plate 47 fitted over the manual shaft 50 is also rotated correspondingly. The rotation of the rod plate 47 is converted into the liner motion of the rod 46 in the axial direction of the motor output shaft, whereby the cam 45 is pushed out. This operation causes the rod 46 to engage with the cam engaging surface of the parking pawl 44, thereby pushing up the cam engaging surface. As a result, the parking pawl 44 is rotated with the pawl shaft 48 serving as a fulcrum, and the pawl portion of the parking pawl 44 meshes with a tooth of the parking gear 43 to lock the rotation of the output shaft 11 of the motor 10.

In a known parking mechanism in a power transmission apparatus for vehicle for an electric car, as disclosed in JP,A 5-116540, a parking gear is formed on a rotary shaft that is coaxial with a motor output shaft, and latch means engaging with or disengaging from the parking gear is movably supported by a motor support member. With such a construction, however, the following disadvantage is resulted because a ring gear, a pinion gear, and a carrier are arranged in the circumferential direction in a planetary reduction gear unit. More specifically, even if the parking gear is mounted over the rotary shaft that is coaxial with the motor output shaft, a parking pawl meshing with the parking gear, as well as a cam and a rod both cooperating with the parking pawl must be arranged outside the circumference of a planetary gear or in an extended area in the axial direction of the motor output shaft. Therefore, the arrangement of the parking pawl, the cam, and the rod increases the size of the reduction gear unit in the circumferential direction or the length thereof in the axial direction of the motor output shaft. The increased size in the circumferential direction or the increased length in the axial direction of the motor output shaft narrows a compartment space or shortens the distance to driving wheels. This may result in an excessively large slope angle of a drive shaft and hence an incapability in mounting to a vehicle.

In contrast, in this embodiment described above, the parking pawl 44, the pawl shaft 48, the cam 45, the rod 46, and the manual shaft 50, which constitute the parking mechanism, are arranged within the reduction gear unit 12 along substantially a circumference about the axis of the motor 10 along which the shafts 31, 32 of the reduction gear unit 12 are also arranged. Such an arrangement enables the power transmission apparatus for vehicle to be kept compact even with the provision of the various parking parts. As a result, it is possible to suppress the influence upon the compartment space or the slope angle of the drive shaft, and to increase flexibility in mounting to a vehicle.

Figure 7:
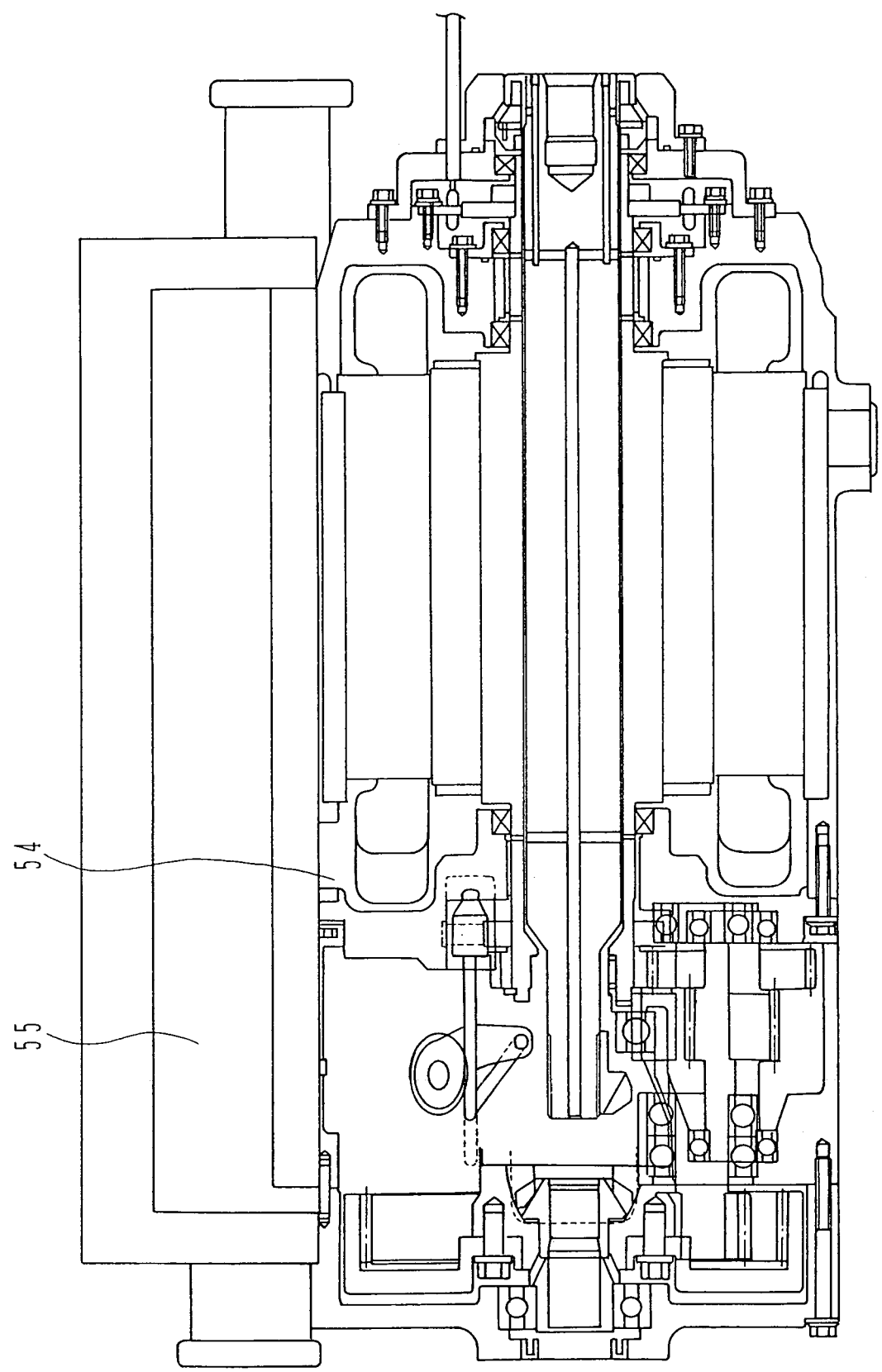
FIG. 7 is a side view showing an arrangement of an inverter used in the power transmission apparatus for vehicle according to the first embodiment of the present invention.
Figure 8:
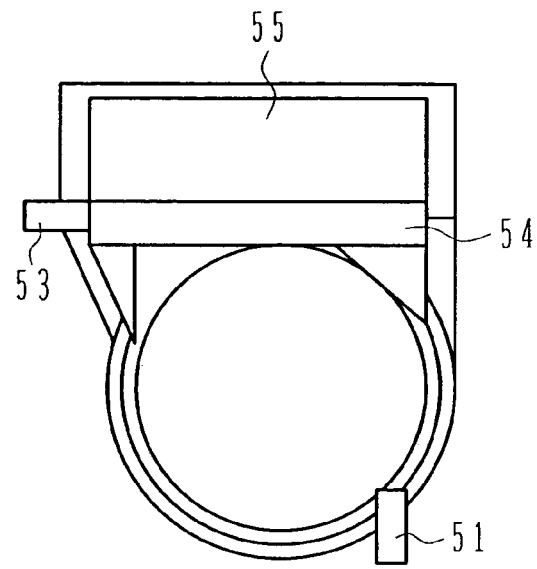
FIG. 8 is a front view of the power transmission apparatus for vehicle shown in FIG. 7.

With reference to FIGS. 7 and 8, a description is next made of an arrangement of the inverter used in the power transmission apparatus for vehicle according to the first embodiment of the present invention, FIG. 7 is a side view showing the arrangement of the inverter used in the power transmission apparatus for vehicle according to the first embodiment of the present invention, and FIG. 8 is a front view of the power transmission apparatus for vehicle shown in FIG. 7.

FIGS. 7 and 8 show a state in which an inverter 55 is mounted to both the motor 10 and the reduction gear unit 12, respectively corresponding to FIGS. 2 and 1. The inverter 55 for supplying voltage to the motor 10 is mounted to both the motor 10 and the reduction gear unit 12 by bolts (not shown). As an alternative, a lower portion of a case for the inverter 55 may be formed integrally with the housings of the motor 10 and the reduction gear unit 12. Water supplied to a cooling system enters a water jacket 54 through an inlet pipe 52, shown in FIG. 1, cools the motor 10 and the inverter 55, and then flows into a radiator (not shown) from an outlet pipe 53 shown in FIG. 1.

Thus, with this embodiment, since the inverter 55 for supplying voltage to the motor 10 is mounted to both the motor 10 and the reduction gear unit 12, the length of wiring from the inverter to the motor can be reduced. Also, since the motor, the reduction gear unit and the inverter are assembled into an integral structure, a process for assembling them to the vehicle can be simplified and a cost reduction can be realized. Further, since the inverter is cooled by utilizing the cooling system for the motor, there is no need of providing an additional cooling system dedicated for the inverter. It is hence possible to increase the cooling efficiency and improve quality of the inverter while holding down the cost.

The construction of a power transmission apparatus for vehicle according to a second embodiment of the present invention will be described below with reference to FIG. 9. This second embodiment represents the case in which a motor axis is perpendicular to an output shaft axis of a differential gear unit.

Figure 9:
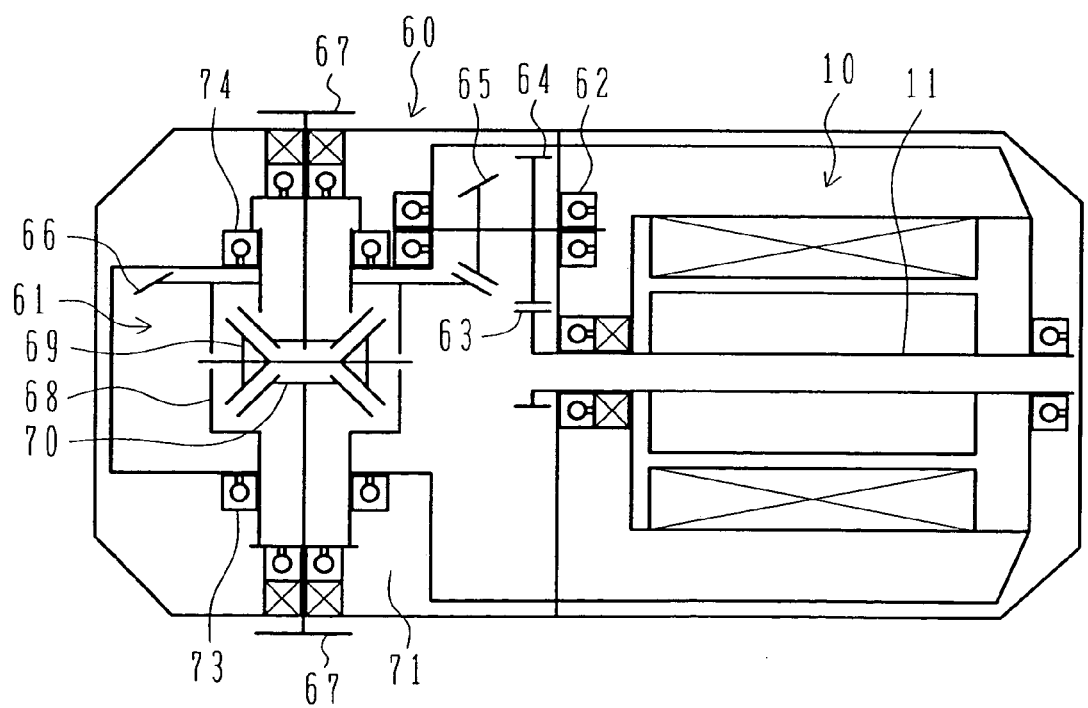
FIG. 9 is a schematic view showing a construction of a power transmission apparatus for vehicle according to a second embodiment of the present invention.

FIG. 9 is a schematic view showing the construction of the power transmission apparatus for vehicle according to the second embodiment of the present invention. In FIG. 9, the same symbols as those in FIG. 3 denote the same components.

A motor 10 is rotatable in forward and backward directions. Torque power outputted from the motor 10 is reduced in speed by a reduction gear unit 60 and then distributed to left and right driving systems through a differential gear unit 61 having an axis perpendicular to an axis of the motor 10. In a similar way to that described above with reference to FIG. 4, two outputs distributed to left and right driving systems through the differential gear unit 61 are coupled to drive shafts (not shown) and then transmitted to driving wheels (not shown). A housing 71 constituting a part of the reduction gear unit 60 has a diameter equal to or smaller than that of a cylindrical housing 20 constituting a part of the motor 10.

The reduction gear unit 60 comprises one shaft 62 parallel to the axis of the motor 10, and gears G 64, H 65 integrally mounted over the shaft 62. The gear G 64 externally meshes with a gear F 63 integrally mounted over an output shaft 11 of the motor 10, thereby performing a first stage speed reduction. The gear H 65 externally meshes with a ring gear I 66 integrally mounted to a case of the differential gear unit 61, thereby performing a second stage speed reduction. By forming each of the gear H 65 and the ring gear I 66 as a bevel gear, a larger reduction gear ratio is realized while the axis of the motor 10 is arranged in perpendicular relation to the axis of the differential gear unit 61. Additionally, the gears G 64 and H 65 constituting the reduction gear unit 60 are respectively a spur gear and a bevel gear.

The differential gear unit 61 comprises the ring gear I 66, a differential case 68 joined to the ring gear I 66 by bolts (not shown), pinion gears 69 fixed to the differential case 68 through a cross pin, and differential side gears 70 meshing with the pinion gears 69. Both ends of the differential gear unit 61 are supported by bearings 73, 74.

The torque power outputted from the motor 10 is reduced in speed by the reduction gear unit 60 and then distributed to left and right extension drive shafts 67 through the differential gear unit 61. The left and right extension drive shafts 67 are connected to the corresponding drive shafts (not shown).

In this second embodiment, as in the layout shown in FIG. 5, the gears 63, 64, 65 and 66 of both the reduction gear unit 60 and the differential gear unit 61 are all arranged inside the outer diameter of the motor 10. Stated another way, the reduction gear unit 60 and the differential gear unit 61 are arranged within an area in oppositely facing relation to an axial end surface of the motor 10 (i.e., an area indicated by the outer diameter of the motor 10 shown in FIG. 5). Further, the reduction gear unit 60 is not a reduction gear mechanism including a revolving shaft as used in a planetary gear mechanism, but it is a reduction gear mechanism including a plurality of gears mounted over the shaft 62 that is rotatably supported by the housing in a fixed position.

With that feature, since the number of meshes between the gears reduces and so does the number of bearings, the power transmission efficiency can be increased. A cost reduction can also be realized. Further, the size of the power transmitting system can be reduced.

Thus, with this embodiment, since the ring gear I 66 of the differential gear unit 61 is arranged between the axis of the output shaft 11 of the motor 10 and the shaft 62 of the reduction gear unit 60 in the radial direction of the motor 10, the gears 63, 64, 65 and 66 of both the reduction gear unit 60 and the differential gear unit 61 are arranged inside the outer diameter of the motor 10. As a result, the size of the power transmitting system can be reduced.

Moreover, with this embodiment, since the bearings 73, 74 supporting both the ends of the differential gear unit 61 are arranged inside the outer diameter of the motor 10, the size of the power transmitting system can be reduced.

In addition, since an oil pump for lubricating the various gears and bearings is driven by the shaft 62, the rotational speed of the oil pump can be held down low even when a maximum rotational speed of the motor 10 exceeds 10,000 rpm.

The parking mechanism described above with reference to FIG. 6 and the mounting arrangement of the inverter described above with reference to FIG. 7 are also applicable to this embodiment.

Figure 10:
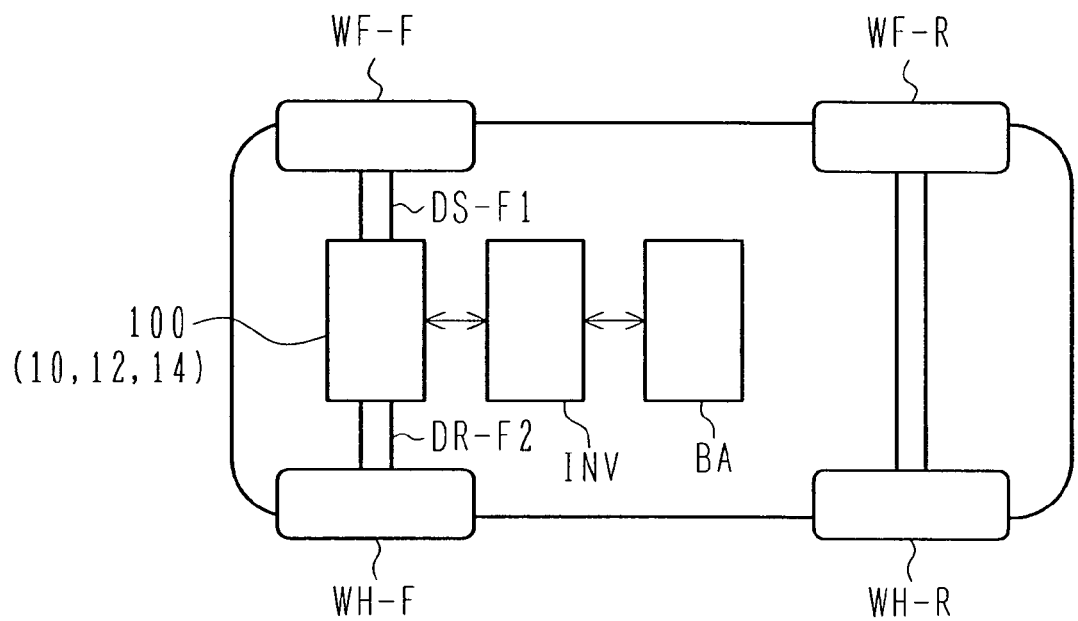
FIG. 10 is a block diagram showing an electric machinery system for driving an electric car, as one of motor-driven vehicles, by using the power transmission apparatus for vehicle according to any of the first and second embodiments of the present invention.

With reference to FIG. 10, a description is now made of an electric machinery system for driving an electric car, as one of motor-driven vehicles, by using the power transmission apparatus for vehicle according to any of the first and second embodiments of the present invention.

FIG. 10 is a block diagram showing the electric machinery system for driving an electric car, as one of motor-driven vehicles, by using the power transmission apparatus for vehicle according to any of the first and second embodiments of the present invention.

Referring to FIG. 10, numeral 100 denotes the power transmission apparatus for vehicle according to any of the first and second embodiments described above. The power transmission apparatus for vehicle 100 comprises the motor 10, the reduction gear unit 12 or 60, and the differential gear unit 14 or 61. Front axles DS-F1, DS-F2 of front wheels WH-F are mechanically connected to respective output shaft ends of the differential gear unit of the power transmission apparatus for vehicle 100. With such an arrangement, the torque power outputted from the motor of the power transmission apparatus for vehicle 100 is transmitted to the front axles DS-F1, DS-F2 for rotation thereof. Then, the front wheels WH-F are rotated by the rotation of the front axles DS-F1, DS-F2, whereby the illustrated electric car is driven. While the description is made here in connection with the case of rotating the front axles DS-F1, DS-F2 by the power transmission apparatus for vehicle 100 and then rotating the front wheels WH-F, the construction may be modified such that the power transmission apparatus for vehicle 100 rotates rear axles for rotations of rear wheels WH-R. The AC side of an inverter INV is electrically connected to a stator coil of the motor of the power transmission apparatus for vehicle 100. The inverter INV is an electric power converter for converting DC power into three-phase AC power and controls driving of the motor of the power transmission apparatus for vehicle 100. A battery BA is electrically connected to the DC side of the inverter INV.

During a powering mode of the electric car (e.g., at startup or during running or acceleration), the front wheels WH-F are driven by the motor of the power transmission apparatus for vehicle 100. To that end, the DC power from the battery BA is supplied to the inverter INV. The supplied DC power is converted into three-phase AC power by the inverter INV. The thus-produced three-phase AC power is supplied to the stator coil of the motor of the power transmission apparatus for vehicle 100. The motor of the power transmission apparatus for vehicle 100 is thereby rotated to output torque power. The outputted torque power is reduced in speed by the reduction gear unit of the power transmission apparatus for vehicle 100 and then introduced to the differential gear unit of the power transmission apparatus for vehicle 100. The introduced torque power is distributed to the left and the right through the differential gear unit of the power transmission apparatus for vehicle 100 for transmission respectively to one of the front axles DS-F1, DS-F2 coupled to one front wheel WH-F and to the other of the front axles DS-F1, DS-F2 coupled to the other front wheel WH-F. Then, the front wheels WH-F are driven with the rotations of the front axles DS-F1, DS-F2.

During a regenerative mode of the electric car (i.e., during deceleration such as when a braking pedal is stepped down, when stepping-down of an accelerator pedal is released, or when stepping-down of the accelerator pedal is stopped), the torque of the front wheels WH-F is transmitted to the motor of the power transmission apparatus for vehicle 100 through the front axles DS-F1, DS-F2 and then through the differential gear unit and the reduction gear unit of the power transmission apparatus for vehicle 100, thereby driving the motor of the power transmission apparatus for vehicle 100 for rotation. Thus, the motor of the power transmission apparatus for vehicle 100 operates as an electric power generator. This operation generates three-phase AC power in the stator coil of the motor of the power transmission apparatus for vehicle 100. The thus-generated three-phase AC power is converted into the predetermined DC power by the inverter INV. The DC power obtained by the AC-DC conversion is supplied to the battery BA. As a result, the battery BA is charged.

Because of employing the power transmission apparatus for vehicle according to any of the above-described embodiments, i.e., employing the power transmission apparatus for vehicle with the reduction gear unit having high torque transmission efficiency, the vehicle-driving electric machinery system of this example can drive the electric car with high efficiency and increase the mileage of the electric car per charge. Also, because of employing the compact power transmission apparatus for vehicle, the vehicle-driving electric machinery system of this example can reduce a space required for mounting in the vehicle. This contributes to reducing the size, the weight and the cost of the vehicle.

Figure 11:
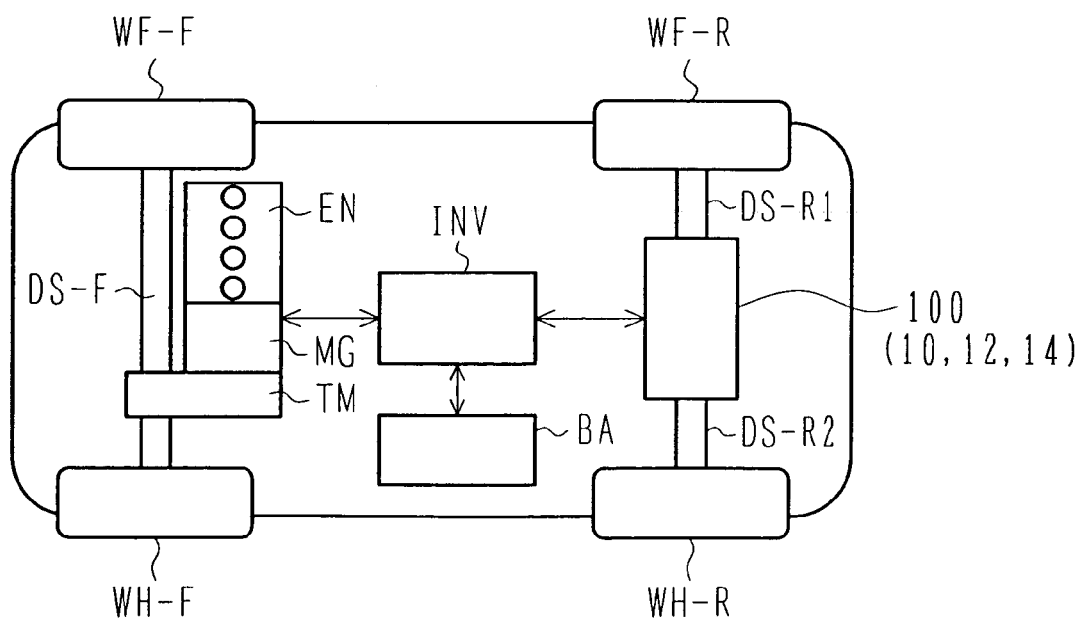
FIG. 11 is a block diagram showing an electric machinery system for driving a hybrid electric car, as another one of motor-driven vehicles, by using the power transmission apparatus for vehicle according to any of the first and second embodiments of the present invention.

With reference to FIG. 11, a description is now made of an electric machinery system for driving a hybrid electric car, as another one of motor-driven vehicles, by using the power transmission apparatus for vehicle according to any of the first and second embodiments of the present invention.

FIG. 11 is a block diagram showing the electric machinery system for driving a hybrid electric car, as another one of motor-driven vehicles, by using the power transmission apparatus for vehicle according to any of the first and second embodiments of the present invention.

The hybrid electric car of this example is of the four-wheel driving type in which front wheels WH-F are driven by an engine (internal combustion engine) EN and a motor generator MG, and rear wheels WH-R are driven by the motor of the power transmission apparatus for vehicle 100. While the description is made here in connection with the case of driving the front wheels WH-F by the engine EN and the motor generator MG and driving the rear wheels WH-R by the motor of the power transmission apparatus for vehicle 100, the construction may be modified so as to drive the rear wheels WH-R by the engine EN and the motor generator MG and to drive the front wheels WH-F by the motor of the power transmission apparatus for vehicle 100.

A transmission TM is mechanically connected to a front axle DS-F for the front wheels WH-F through a differential gear unit (not shown). The engine EN and the motor generator MG are mechanically connected to the transmission TM through a power control mechanism (not shown). The power control mechanism (not shown) serves as a mechanism for combining or distributing the outputted torque power. The AC side of an inverter INV is electrically connected to a stator coil of the motor generator MG. The inverter INV is an electric power converter for converting DC power into three-phase AC power and controls driving of the motor generator MG. A battery BA is electrically connected to the DC side of the inverter INV.

Output shaft ends of the differential gear unit of the power transmission apparatus for vehicle 100 are mechanically connected to rear axles DS-R1, DS-R2 for the rear wheels WH-R. The AC side of the inverter INV is also electrically connected to a stator coil of the motor of the power transmission apparatus for vehicle 100. The inverter INV is in common to the motor generator MG and the motor of the power transmission apparatus for vehicle 100. The inverter INV comprises a conversion circuit unit for the motor generator MG, a conversion circuit unit for the motor of the power transmission apparatus for vehicle 100, and a control unit for operating those conversion circuit units.

At startup or during low-speed running of the hybrid electric car (i.e., in a region where operation efficiency of the engine EN (fuel efficiency) reduces), the front wheels WH-F are driven by the motor generator MG. While the description is made here in connection with the case of driving the front wheels WH-F by the motor generator MG at startup or during low-speed running of the hybrid electric car, the construction may be modified such that the front wheels WH-F are driven by the motor generator MG and the rear wheels WH-R are driven by the motor of the power transmission apparatus for vehicle 100 (i.e., the vehicle runs with four-wheel driving). The DC power from the battery BA is supplied to the inverter INV. The supplied DC power is converted into three-phase AC power by the inverter INV. The thus-produced three-phase AC power is supplied to the stator coil of the motor generator MG. The motor generator MG is thereby rotated to output torque power. The outputted torque power is introduced to the transmission TM through the power control mechanism (not shown). The introduced torque power is changed in speed by the transmission TM and then inputted to the differential gear unit (not shown). The inputted torque power is distributed to the left and the right through the differential gear unit (not shown) for transmission respectively to one front axle DS-F coupled to one front wheel WH-F and to the other front axle DS-F coupled to the other front wheel WH-F, whereby the front axles DS-F are driven for rotation. Then, the front wheels WH-F are driven with the rotations of the front axles DS-F.

During ordinary running of the hybrid electric car (i.e., when the vehicle runs over a dry road surface with the engine EN being in a region of good operation efficiency (fuel efficiency)), the front wheels WH-F are driven by the engine EN. To that end, torque power outputted from the engine EN is introduced to the transmission TM through the power control mechanism (not shown). The introduced torque power is changed in speed by the transmission TM. The torque power having been subjected to the speed change is transmitted to the front axles DS-F through the differential gear unit (not shown), whereby the front wheels WH-F are driven for rotation. When the battery BA requires to charged as a result of detecting the charged state of the battery BA, the torque power outputted from the engine EN is partly distributed to the motor generator MG through the power control mechanism (not shown) so that the motor generator MG is driven for rotation. Thus, the motor generator MG operates as an electric power generator. This operation generates three-phase AC power in the stator coil of the motor generator MG. The thus-generated three-phase AC power is converted into the predetermined DC power by the inverter INV. The DC power obtained by the AC-DC conversion is supplied to the battery BA. As a result, the battery BA is charged.

During four-wheel drive running of the hybrid electric car (i.e., when the vehicle runs over a low-μ road, such as a snow-covered road, with the engine EN being in a region of good operation efficiency (fuel efficiency)), the rear wheels WH-R are driven by the motor of the power transmission apparatus for vehicle 100. At the same time, as in the above-described case of ordinary running, the front wheels WH-F are driven by the engine EN. Further, because the charge amount of the battery BA reduces with the driving of the motor of the power transmission apparatus for vehicle 100, the motor generator MG is driven for rotation by the torque power outputted from the engine EN to charge the battery BA, as in the above-described case of ordinary running. In order to drive the rear wheels WH-R by the motor of the power transmission apparatus for vehicle 100, the DC power from the battery BA is supplied to the inverter INV. The supplied DC power is converted into three-phase AC power by the inverter INV. The thus-produced three-phase AC power is supplied to the stator coil of the motor of the power transmission apparatus for vehicle 100. The motor of the power transmission apparatus for vehicle 100 is thereby rotated to output torque power. The outputted torque power is reduced in speed by the reduction gear unit of the power transmission apparatus for vehicle 100 and then introduced to the differential gear unit of the power transmission apparatus for vehicle 100. The introduced torque power is distributed to the left and the right through the differential gear unit of the power transmission apparatus for vehicle 100 for transmission respectively to one of the rear axles DS-R1, DS-R2 coupled to one rear wheel WH-R and to the other of the rear axles DS-R1, DS-R2 coupled to the other rear wheel WH-R, whereby the front axles DS-R are driven for rotation. Then, the rear wheels WH-R are driven with the rotations of the rear axles DS-R1, DS-R2.

During acceleration of the hybrid electric car, the front wheels WH-F are driven by the engine EN and the motor generator MG. While the description is made here in connection with the case of driving the front wheels WH-F by the engine EN and the motor generator MG, the construction may be modified such that the front wheels WH-F are driven by the engine EN and the motor generator MG and the rear wheels WH-R are driven by the motor of the power transmission apparatus for vehicle 100 (i.e., the vehicle runs with four-wheel driving). Torque power outputted from both the engine EN and the motor generator MG is introduced to the transmission TM through the power control mechanism (not shown). The introduced torque power is changed in speed by the transmission TM. The torque power having been subjected to the speed change is transmitted to the front axles DS-F through the differential gear unit (not shown), whereby the front wheels WH-F are driven for rotation.

During a regenerative mode of the hybrid electric car (i.e., during deceleration such as when a braking pedal is stepped down, when stepping-down of an accelerator pedal is released, or when stepping-down of the accelerator pedal is stopped), the torque of the front wheels WH-F is transmitted to the motor generator MG through the front axles DS-F, the differential gear unit (not shown), the transmission TM, and the power control mechanism (not shown), thereby driving the motor generator MG for rotation. Thus, the motor generator MG operates as an electric power generator. This operation generates three-phase AC power in the stator coil of the motor generator MG. The thus-generated three-phase AC power is converted into the predetermined DC power by the inverter INV. The DC power obtained by the AC-DC conversion is supplied to the battery BA. As a result, the battery BA is charged. On the other hand, the torque of the rear wheels WH-R is transmitted to the motor of the power transmission apparatus for vehicle 100 through the rear axles DS-R1, DS-R2 and then through the differential gear unit and the reduction gear unit of the power transmission apparatus for vehicle 100, thereby driving the motor of the power transmission apparatus for vehicle 100 for rotation. Thus, the motor of the power transmission apparatus for vehicle 100 operates as an electric power generator. This operation generates three-phase AC power in the stator coil of the motor of the power transmission apparatus for vehicle 100. The thus-generated three-phase AC power is converted into the predetermined DC power by the inverter INV. The DC power obtained by the AC-DC conversion is supplied to the battery BA. As a result, the battery BA is further charged.

The gear layout as another feature of the power transmission apparatus for vehicle according to a third embodiment of the present invention will be described below with reference to FIGS. 12 to 14.

Figure 12:
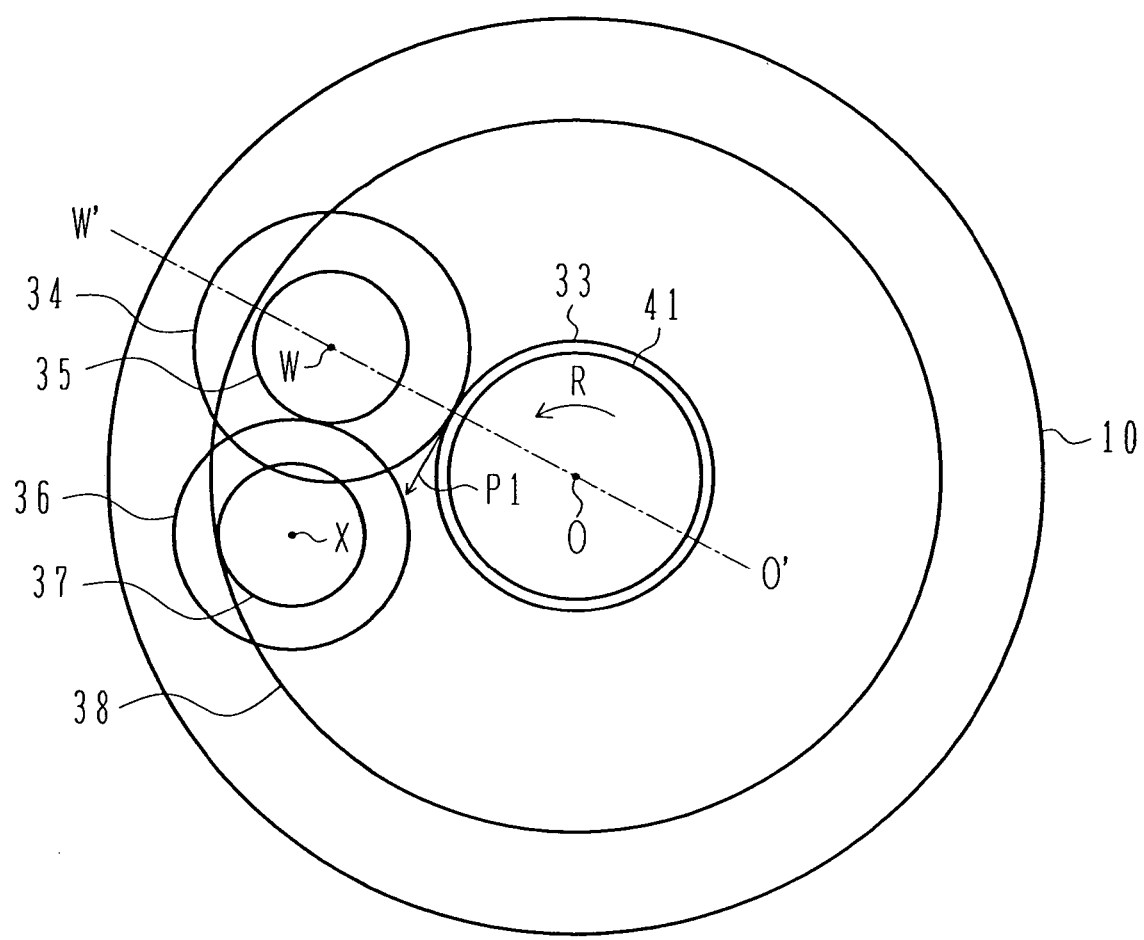
FIG. 12 is a front view for explaining a gear layout in the power transmission apparatus for vehicle according to a third embodiment of the present invention.

First, with reference to FIG. 12, a description is made of the gear layout in the power transmission apparatus for vehicle according to the third embodiment of the present invention.

FIG. 12 is a front view for explaining the gear layout in the power transmission apparatus for vehicle according to the third embodiment of the present invention.

The gear A 33 mounted over the output shaft 11 of the motor 10 meshes with the gear B 34 of the reduction gear unit 12. The gear C 35 being coaxial with the gear B 34 meshes with the gear D 36. The gear E 37 being coaxial with the gear D 36 meshes with the internal ring gear F 38 of the differential gear unit 14. The internal ring gear F 38 drives the pinion gears 41. Note that a circle indicating each of the gears 33, 34, 35, 36, 37, 38 and 41 represents a pitch diameter.

As seen from FIG. 12, in this embodiment, the reduction gear unit 12 and the gears 33, 34, 35, 36, 37, 38 and 41 of the differential gear unit 14 are all arranged inside the outer diameter of the motor 10. Stated another way, the reduction gear unit 12 and the differential gear unit 14 are arranged within an area in oppositely facing relation to an axial end surface of the motor 10 (i.e., an area indicated by the outer diameter of the motor 10 shown in FIG. 12). Further, the reduction gear unit 12 is not a reduction gear mechanism including a revolving shaft as used in a planetary gear mechanism, but it is a reduction gear mechanism including a plurality of gears mounted over the shafts 31, 32 that are rotatably supported by the housing in fixed positions.

With that feature, since the number of meshes between the gears reduces and so does the number of bearings, the power transmission efficiency can be increased. A cost reduction can also be realized. Further, the size of the power transmitting system can be reduced.

In the power transmission apparatus for vehicle shown in FIG. 12, the internal ring gear F 38 serves as an internal gear, and the gear F 37 meshing with the internal ring gear F 38 serves as an external gear. Then, the gear F 37 overhangs the bearing assembled to the second shaft 32. In the arrangement of this embodiment, therefore, the bearing assembled to the second shaft 32 and positioned on the side close to the gear F 37 undergoes the largest force and the severest conditions. To reduce the force applied to that bearing, in this embodiment, the gears are arranged as follows. Let here assume, as shown in FIG. 12, that the axis of the output shaft 11 of the motor 10 as a torque power generator is denoted by O, the axis of the first shaft 31 of the reduction gear unit 12 is denoted by W, and a line connecting the axis O and the axis W is denoted by O'-W'. Also, assume that P1 represents a tangential force generating at a mesh point between the gear 33 mounted over the output shaft 11 of the motor 10 as a torque power generator and the gear 34 mounted over the rotary shaft 31 of the reduction gear unit 12 when the vehicle runs forward (i.e., when the gear 33 is rotated in the direction of an arrow R). This embodiment is featured in that, on the above assumption, the axis of the second shaft 32 of the reduction gear unit 12 is arranged on the side in the same direction as the tangential force P1 with respect to the line O'-W'. Such an arrangement minimizes a resultant force of the tangential force, a separation force, and a thrust force. As a result, the bearing and the bearing support are optimized (minimized in size), the parts can be arranged with more ease, and the degree of freedom in design is increased. Further, since the strength of the bearing and the bearing support can be ensured with more ease, it is possible to reduce the size and weight, and to realize a cost reduction. In addition, since the resultant force can be reduced when the vehicles runs forward, i.e., during most of a running period of the vehicle, the burden imposed on the bearing and the bearing support can be lessened.

Figure 13:
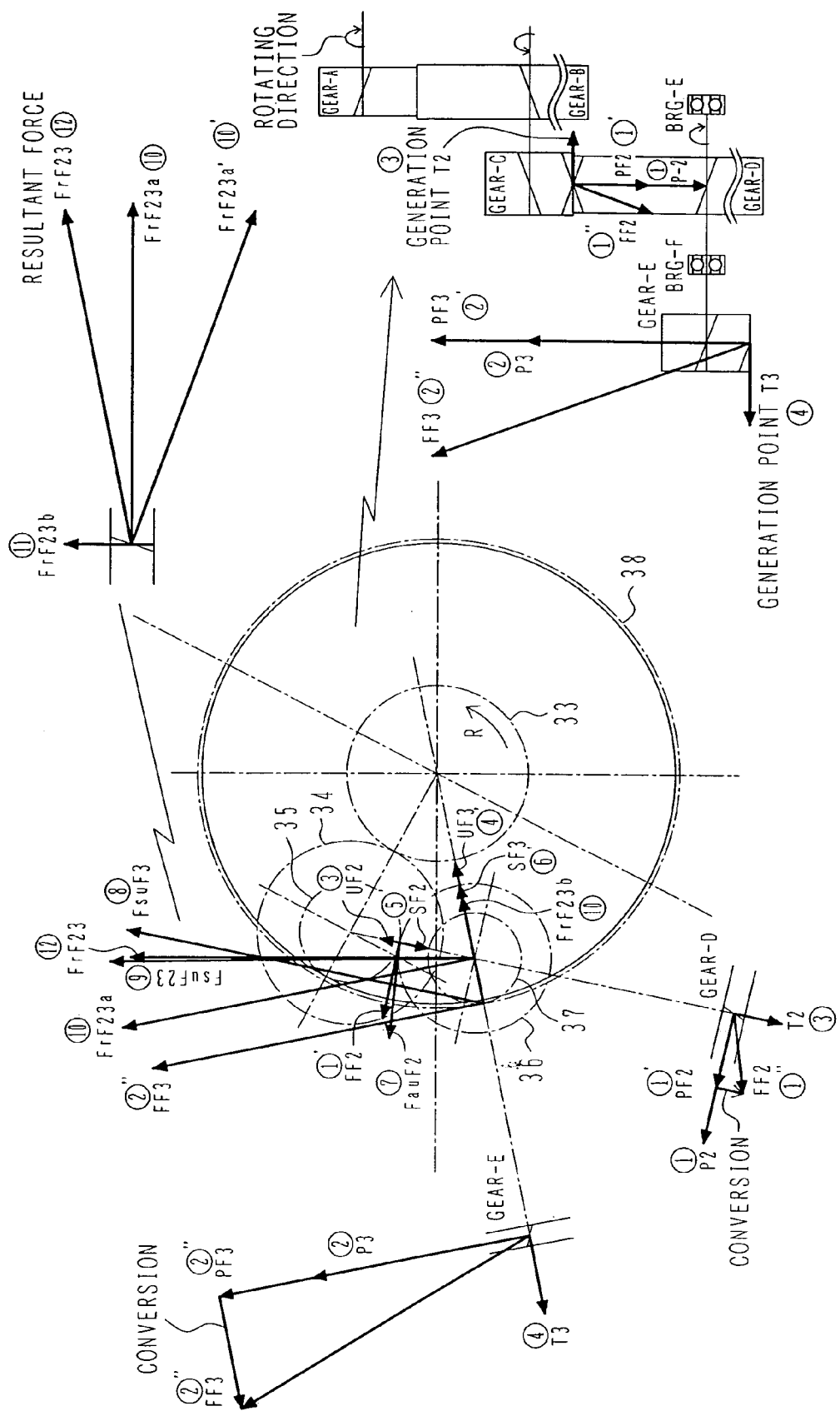
FIG. 13 is an illustration for explaining a resultant force of a tangential force, a separation force and a thrust force in the power transmission apparatus for vehicle according to the third embodiment of the present invention.
Figure 14:
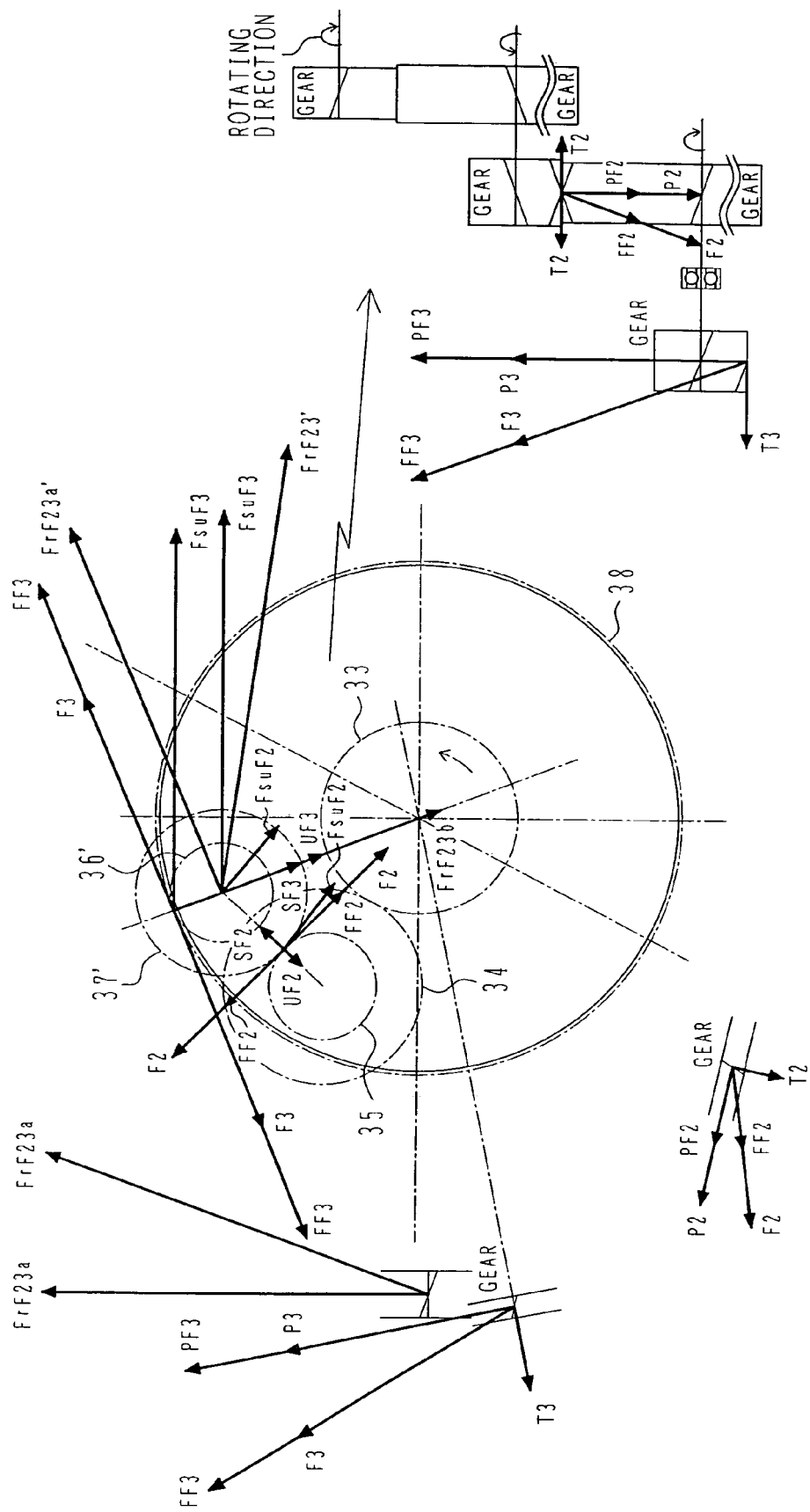
FIG. 14 is an illustration for explaining a resultant force of a tangential force, a separation force and a thrust force in a comparative example.

With reference to FIGS. 13 and 14, the resultant force of the tangential force, the separation force, and the thrust force in the power temperature system of this embodiment will be described in detail below in comparison with a comparative example.

FIG. 13 is an illustration for explaining a resultant force of a tangential force, a separation force and a thrust force in the power transmission apparatus for vehicle according to the third embodiment of the present invention. FIG. 14 is an illustration for explaining a resultant force of a tangential force, a separation force and a thrust force in the comparative example. Note that, in FIGS. 13 and 14, the same symbols as those in FIG. 12 denote the same components.

The gears 33, 34, 35, 36, 37 and 38 shown in FIG. 13 are the same as those shown in FIG. 12. FIG. 13 shows the magnitudes and directions of forces applied to the bearing on the side close to the gear 37 during forward rotation of the motor (i.e., during rotation of the gear 33 in the direction of the arrow R), namely when the vehicle runs forward. The torque power outputted from the motor is transmitted from the gear A 33 to the gear B 34 and then transmitted to the gear C 35 through the first shaft 31. The bearing close to the gear 37 undergoes a force transmitted from the gear C 35 and a reaction force from the internal ring gear F 38. A resultant load is expressed by FrF23. The resultant load FrF23 will be described below.

A description is first made of tangential forces applied to the gears 36, 37. When a tangential force P2 ((1) in the drawing) applied to the gear 36 (GEAR-D) is converted into a force (radial load) perpendicular to the bearings supporting both the ends of the shaft 32 to which the gear 36 is fixed, a force PF2 ((1') in the drawing) is obtained. Also, when the force PF2 is converted into a force in a plane perpendicular to the teeth of the gear 36, a force FF2 ((1") in the drawing) is obtained. When a reaction force P3 ((2) in the drawing) of a tangential force applied to the gear 37 (GEAR-E) is converted into a force (radial load) perpendicular to the bearings supporting both the ends of the shaft 32 to which the gear 37 is fixed, a force PF3 ((2') in the drawing) is obtained. Further, when the force PF3 is converted into a force in a plane perpendicular to the teeth of the gear 37, a force FF3 ((2") in the drawing) is obtained.

A description is next made of thrust forces applied to the gears 36, 37. When a thrust force T2 ((3) in the drawing) of the gear 36 (GEAR-D) is converted into a force (radial load) perpendicular to the bearings supporting both the ends of the shaft 32 to which the gear 36 is fixed, a force UF2 ((3') in the drawing) is obtained. When a reaction force T3 ((4) in the drawing) of a thrust force applied to the gear 37 (GEAR-E) is converted into a force (radial load) perpendicular to the bearings supporting both the ends of the shaft 32 to which the gear 37 is fixed, a force UF3 ((4') in the drawing) is obtained.

A description is next made of separations forces applied the gears 36, 37. Of the separation force applied to the gear 36 (GEAR-D), a component force (radial load) perpendicular to the bearings supporting both the ends of the shaft 32, to which the gear 36 is fixed, is obtained as a force SF2 ((5') in the drawing). Also, of a reaction force of the separation force applied to the gear 37 (GEAR-E), a component force (radial load) perpendicular to the bearings supporting both the ends of the shaft 32, to which the gear 37 is fixed, is obtained as a force SF3 ((6') in the drawing).

A description is next made of a resultant force of the tangential force, the thrust force, and the separation force applied to each of the gears 36, 37. A resultant force FsuF2 ((7) in the drawing) applied to the gear 36 is given as the vector sum of the force FF2 ((1") in the drawing), the force UF2 ((3') in the drawing), and the force SF2 ((5') in the drawing). Also, a resultant force FsuF3 ((8) in the drawing) applied to the gear 37 is given as the vector sum of the force FF3 ((2") in the drawing), the force UF3 ((4') in the drawing), and the force SF3 ((6') in the drawing).

Then, a resultant force FsuF23 ((9) in the drawing) for the gears 36, 37 is given as the vector sum of the resultant force FsuF2 ((7) in the drawing) applied to the gear 36 and the resultant force FsuF3 ((8) in the drawing) applied to the gear 37. When the resultant force FsuF23 ((9) in the drawing) for the gears 36, 37 is resolved into sin and cos components, these components are given as a force FrF23a ((10) in the drawing) and a force FrF23b ((11) in the drawing), respectively. Further, when the force FrF23a ((10) in the drawing) is converted into a force (radial load) perpendicular to the bearings supporting both the ends of the shaft 32 to which the gears 36, 37 are fixed, a force PrF23a' ((10') in the drawing) is obtained.

Accordingly, a resultant force FrF23 ((12) in the drawing) for the gears 36, 37 is given as the vector sum of the force PrF23a' ((10') and the force FrF23b ((11) in the drawing).

On the other hand, FIG. 14 shows the comparative example wherein an axis of a second shaft, over which gears 36', 37' are mounted, is arranged in the direction opposed to the tangential force P1 with respect to the line O'-W'. When a resultant force FrF23' for the gears 36', 37' in such an arrangement is determined in a similarly manner to that described above with reference to FIG. 13, the resultant force FrF23' is greater than the resultant force FrF23 for the gears 36, 37 shown in FIG. 13.

As described above, the resultant force of the tangential force, the separation force, and the thrust force can be minimized by arranging, with respect to the line connecting the axis of the output shaft of the torque power generator and the axis of the first shaft of the reduction gear unit, the axis of the second shaft of the reduction gear unit on the side away from in the same direction as the direction in which the torque power generator is rotated when the vehicle runs forward. As a result, the bearing and the bearing support are optimized (minimized in size), the parts can be arranged with more ease, and the degree of freedom in design is increased. Further, since the strength of the bearing and the bearing support can be ensured with more ease, it is possible to reduce the size and weight, and to realize a cost reduction. In addition, since the resultant force can be reduced when the vehicles runs forward, i.e., during most of a running period of the vehicle, the burden imposed on the bearing and the bearing support can be lessened.

While, as shown in FIG. 3, the gear E 37 and the internal ring gear F 38 are a combination of an external gear and an internal gear in this embodiment, they may be a combination of two bevel gears.

Because of employing the power transmission apparatus for vehicle according to the above-described embodiment, i.e., employing the power transmission apparatus for vehicle with the reduction gear unit having high torque transmission efficiency, a vehicle-driving electric machinery system utilizing the above-described feature can realize torque assist comparable to that obtainable with a car of the mechanical four-wheel driving type. Also, because of employing the compact power transmission apparatus for vehicle, the vehicle-driving electric machinery system utilizing the above-described feature can reduce a space required for mounting in the vehicle. This contributes to reducing the size, the weight and the cost of the vehicle.

According to the present invention, a power transmission apparatus for vehicle is obtained which can increase the torque transmission efficiency of a reduction gear mechanism, can realize a large reduction gear ratio, and is more compact.

According to the present invention, it is possible to reduce radial loads acting upon the bearing and the bearing support, and to achieve a more compact structure.

What is claimed is:

1. A power transmission apparatus for vehicle comprising a motor, a reduction gear unit for decelerating power outputted from said motor, and a differential gear unit for distributing the torque power decelerated by said reduction gear unit to left and right wheels, wherein:

said reduction gear unit is a reduction gear mechanism including a rotary shaft which is rotatably held by a housing, over which a plurality of gears are mounted in parallel and which is arranged parallel to at least an output shaft of said motor, said reduction gear unit and said differential gear unit are arranged within an area in oppositely facing relation to an axial end surface of said motor, and said plurality of gears are arranged inside an outer diameter of said motor.

2. A power transmission apparatus for vehicle according to claim 1, wherein said reduction gear unit comprises at least one gear shaft parallel to an axis of an output shaft of said motor, and gears mounted over said gear shaft and included in said differential gear unit, and an axis of said differential gear unit is coaxially with the axis of the output shaft of said motor.

3. A power transmission apparatus for vehicle according to claim 2, further comprising an oil pump disposed in said reduction gear unit, wherein said oil pump is driven by said gear shaft which is rotated by the decelerated torque power outputted from said motor.

4. A power transmission apparatus for vehicle according to claim 1, further comprising a parking mechanism made up of a parking gear, a parking pawl, a pawl shaft, a cam, a rod, and a manual shaft, wherein said parking pawl, said pawl shaft, said cam, said rod, and said manual shaft are arranged within said reduction gear unit substantially along a circumference about an axis of said motor along which a shaft of said reduction gear unit is arranged.

5. A power transmission apparatus for vehicle according to claim 1, wherein an inverter for supplying voltage to said motor is mounted to said motor and said reduction gear unit, and said inverter is cooled by a cooling system for said motor.

6. A power transmission apparatus for vehicle according to claim 1, wherein a ring gear of said differential gear unit is arranged between an axis of an output shaft of said motor and a gear shaft of said reduction gear unit in the radial direction of said motor.

7. A power transmission apparatus for vehicle according to claim 1, wherein bearings for supporting both ends of said differential gear unit are arranged inside an outer diameter of said motor.

8. A power transmission apparatus for vehicle according to claim 1, wherein,
an output shaft of said motor, and a first shaft and a second shaft of said reduction gear unit each has an axis of rotation,
when the vehicle runs forward, a tangential force is generated, in a direction perpendicular to a line connecting the output shaft axis and the first reduction gear shaft axis, at a mesh point between a gear mounted over the output shaft of said motor and a gear mounted over the first shaft of said reduction gear unit, and
the axis of the second shaft of said reduction gear unit is arranged on a side of said line between the output shaft axis and the first reduction gear axis which is in the same direction as the direction of the tangential force.

9. A power transmission apparatus for vehicle for transmitting power outputted from a power supply source to axles of vehicle wheels, said power transmission apparatus for vehicle comprising:
a motor constituting said power supply source;
a reduction gear unit for receiving and decelerating the power outputted from said motor; and
a differential gear unit for receiving the torque power from said reduction gear unit and distributing the received torque power to at least two outputs, wherein:
said reduction gear unit is a gear mechanism mechanically connected to said motor and said differential gear unit,
said gear mechanism includes a rotary shaft over which a plurality of gears are mounted and which is arranged parallel to at least an output shaft of said motor, and
said reduction gear unit and said differential gear unit are arranged within an area in oppositely facing relation to an axial end surface of said motor, and
said plurality of gears are arranged inside an outer diameter of said motor.

10. A power transmission apparatus for vehicle according to claim 9, wherein said motor, said reduction gear unit, and said differential gear unit are disposed within a housing, and
output shafts of said differential gear unit have ends extended externally of said housing such that said axles are mechanically connectable to said ends.

11. A power transmission apparatus for vehicle according to claim 9, wherein said gear mechanism includes at least two rotary shafts,
at least two gears are mounted over each of said rotary shafts,
said rotary shafts are arranged parallel to each other and are arranged parallel to at least an output shaft of said motor,
one of said gears mounted over one of said rotary shafts is mechanically connected to the output shaft of said motor,
one of said gears mounted over the other of said rotary shafts is mechanically connected to the input side of said differential gear unit, and
the other of said gears mounted over one of said rotary shafts is mechanically connected to the other of said gears mounted over the other of said rotary shafts.

12. A power transmission apparatus for vehicle according to claim 11, wherein said rotary shafts are arranged parallel to output shafts of said differential gear unit,
the output shaft of said motor is a hollow shaft, and
one of output shafts of said differential gear unit is inserted through said hollow shaft.

13. A power transmission apparatus for vehicle according to claim 9, wherein at least two gears are mounted over said rotary shaft,
said rotary shaft is arranged perpendicularly to output shafts of said differential gear unit,
one of said gears is constituted by a spur gear and is mechanically connected to the output shaft of said motor, and
the other of said gears is constituted by a bevel gear and is mechanically connected to the input side of said differential gear unit.

14. A vehicle-driving electric machinery system for transmitting power to axles of vehicle wheels and driving a vehicle, said vehicle-driving electric machinery system comprising:
a motor driven by a vehicle-loaded electric power supply source serving as a driving source, and generating the torque power; and
a power transmission apparatus for vehicle for transmitting the power outputted from said motor to said axles,
said power transmission apparatus for vehicle comprising:
a reduction gear unit for receiving and decelerating the power outputted from said motor; and
a differential gear unit for receiving the power from said reduction gear unit and distributing the received power to at least two outputs, wherein:
said power transmission apparatus for vehicle is arranged within an area in oppositely facing relation to an axial end surface of said motor,
said power transmission apparatus for vehicle is disposed in a housing together with said motor to constitute one unit,
said axles are mechanically connected to ends of output shafts of said differential gear unit,
said reduction gear unit is a gear mechanism including a rotary shaft over which a plurality of gears are mounted and which is arranged parallel to at least an output shaft of said motor, and
said reduction gear unit mechanically connects said motor and said differential gear unit to each other.

15. A vehicle-driving electric machinery system according to claim 14, wherein said vehicle-loaded electric power supply source is a battery,
said motor is an AC motor, and
the torque power outputted from said motor is controlled in accordance with operation of an electric power converter for receiving DC power supplied from said battery and converting the DC power into AC power.

16. A vehicle-driving electric machinery system according to claim 15, wherein said electric power converter is mounted to said housing and is cooled by a coolant used for cooling said motor.

17. A vehicle-driving electric machinery system according to claim 15, wherein said motor constitutes a driving source for the vehicle together with an internal combustion engine mounted in the vehicle.

18. A vehicle-driving electric machinery system according to claim 17, wherein said motor drives ones of said vehicle wheels which differ from the others driven by said internal combustion engine for rotation.

19. A power transmission apparatus for vehicle comprising a motor, a reduction gear unit including at least two shafts parallel to an axis of said motor and decelerating power outputted from said motor, and a differential gear unit for distributing the power decelerated by said reduction gear unit to left and right wheels, wherein:
- an output shaft of said motor, and a first shaft and a second shaft of said reduction gear unit each has an axis of rotation,
- when the vehicle runs forward, a tangential force is generated, in a direction perpendicular to a line connecting the output shaft axis and the first reduction gear shaft axis, at a mesh point between a gear mounted over the output shaft of said motor and a gear mounted over the first shaft of said reduction gear unit, and
- the axis of the second shaft of said reduction gear unit is arranged on a side of said line between the output shaft axis and the first reduction gear axis which is in the same direction as the direction of the tangential force.

20. A vehicle-driving electric machinery system for transmitting power to axles of vehicle wheels and driving a vehicle, said vehicle-driving electric machinery system comprising:
- a motor driven by a vehicle-loaded electric power supply source serving as a driving source, and generating the power; and
- a power transmission apparatus for vehicle for transmitting the power outputted from said motor to said axles,
- said power transmission apparatus for vehicle comprising:
- said motor;
- a reduction gear unit including at least two shafts parallel to an axis of said motor and decelerating the torque power outputted from said motor; and
- a differential gear unit for distributing the power decelerated by said reduction gear unit to left and right wheels, wherein:
- an output shaft of said motor, and a first shaft and a second shaft of said reduction gear unit each has an axis of rotation,
- when the vehicle runs forward, a tangential force is generated, in a direction perpendicular to a line connecting the output shaft axis and the first reduction gear shaft axis, at a mesh point between a gear mounted over the output shaft of said motor and a gear mounted over the first shaft of said reduction gear unit, and
- the axis of the second shaft of said reduction gear unit is arranged on a side of said line between the output shaft axis and the first reduction gear axis which is in the same direction as the direction of the tangential force.

21. A power transmission apparatus according to claim 1, wherein a final gear of said reduction unit is in mesh with internal teeth of an internal ring gear of said differential gear unit.

22. A power transmission apparatus according to claim 1, wherein said differential gear unit is disposed coaxial with said motor.

23. A power transmission apparatus according to claim 9, wherein a final gear of said reduction unit is in mesh with internal teeth of an internal ring gear of said differential gear unit.

24. A power transmission apparatus for vehicle comprising a motor, a reduction gear unit for decelerating power outputted from said motor, and a differential gear unit for distributing the torque power decelerated by said reduction gear unit to left and right wheels, wherein:
- said reduction gear unit is a reduction gear mechanism including a rotary shaft which is rotatably held by a housing, over which a plurality of gears are mounted in parallel and which is arranged parallel to at least an output shaft of said motor,
- said reduction gear unit and said differential gear unit are arranged within an area in oppositely facing relation to an axial end surface of said motor,
- said plurality of gears are arranged inside an outer diameter of said motor, and
- a final gear of said reduction unit is in mesh with internal teeth of an internal ring gear of said differential gear unit.

25. A power transmission apparatus for vehicle for transmitting power outputted from a power supply source to axles of vehicle wheels, said power transmission apparatus for vehicle comprising:
- a motor constituting said power supply source;
- a reduction gear unit for receiving and decelerating the power outputted from said motor; and
- a differential gear unit for receiving the torque power from said reduction gear unit and distributing the received torque power to at least two outputs, wherein:
- said reduction gear unit is a gear mechanism mechanically connected to said motor and said differential gear unit,
- said gear mechanism includes a rotary shaft over which a plurality of gears are mounted and which is arranged parallel to at least an output shaft of said motor, and
- said reduction gear unit and said differential gear unit are arranged within an area in oppositely facing relation to an axial end surface of said motor,
- said plurality of gears are arranged inside an outer diameter of said motor, and
- a final gear of said reduction unit is in mesh with internal teeth of an internal ring gear of said differential gear unit.

* * * * *